Figure 1:
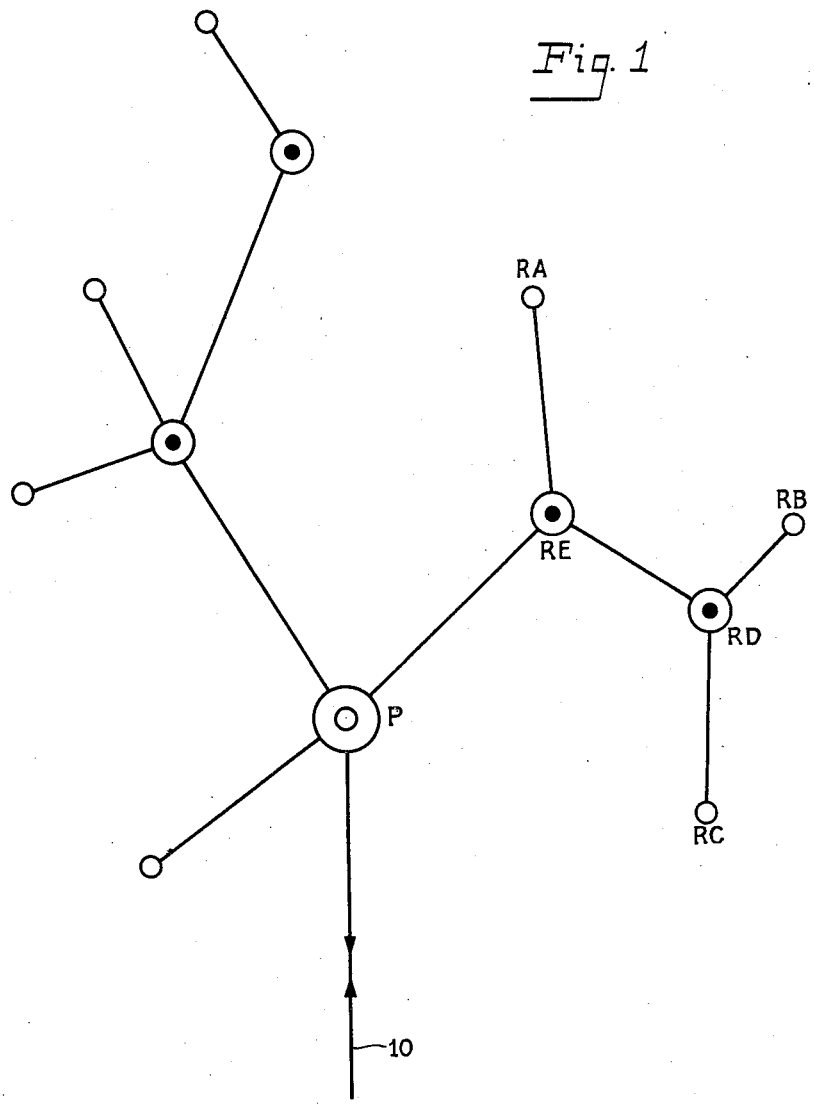

May 23, 1950 G. T. BAKER 2,508,636
TELEPHONE SYSTEM EMPLOYING CONNECTING SWITCHES HAVING
AUTOMATIC IMPULSING MEANS LOCAL TO THE CONNECTING
SWITCHES AND CONTROLLED BY THE CALLING LINES
Filed Nov. 11, 1944 18 Sheets-Sheet 1

INVENTOR
GEORGE THOMAS BAKER

BY
ATTORNEY

May 23, 1950 G. T. BAKER 2,508,636
TELEPHONE SYSTEM EMPLOYING CONNECTING SWITCHES HAVING
AUTOMATIC IMPULSING MEANS LOCAL TO THE CONNECTING
SWITCHES AND CONTROLLED BY THE CALLING LINES
Filed Nov. 11, 1944 18 Sheets-Sheet 2

INVENTOR
GEORGE THOMAS BAKER

BY
ATTORNEY

INVENTOR
GEORGE THOMAS BAKER

May 23, 1950 G. T. BAKER 2,508,636
TELEPHONE SYSTEM EMPLOYING CONNECTING SWITCHES HAVING
AUTOMATIC IMPULSING MEANS LOCAL TO THE CONNECTING
SWITCHES AND CONTROLLED BY THE CALLING LINES
Filed Nov. 11, 1944 18 Sheets-Sheet 6

INVENTOR
GEORGE THOMAS BAKER
BY
ATTORNEY

INVENTOR
GEORGE THOMAS BAKER

May 23, 1950 G. T. BAKER 2,508,636
TELEPHONE SYSTEM EMPLOYING CONNECTING SWITCHES HAVING
AUTOMATIC IMPULSING MEANS LOCAL TO THE CONNECTING
SWITCHES AND CONTROLLED BY THE CALLING LINES
Filed Nov. 11, 1944 18 Sheets-Sheet 9
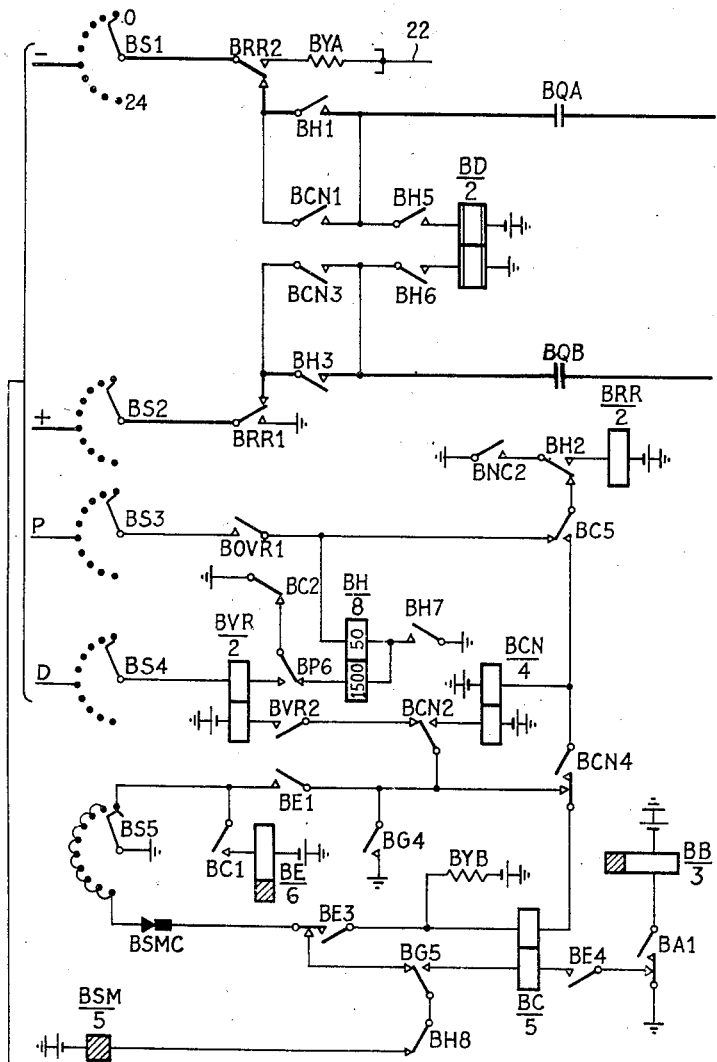
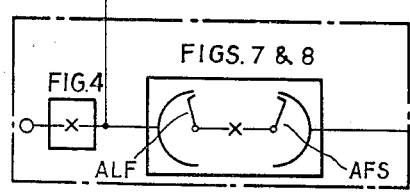
Fig. 9
INVENTOR
GEORGE THOMAS BAKER
BY
ATTORNEY May 23, 1950 G. T. BAKER 2,508,636
TELEPHONE SYSTEM EMPLOYING CONNECTING SWITCHES HAVING
AUTOMATIC IMPULSING MEANS LOCAL TO THE CONNECTING
SWITCHES AND CONTROLLED BY THE CALLING LINES
Filed Nov. 11, 1944 18 Sheets-Sheet 13

INVENTOR
GEORGE THOMAS BAKER

BY
ATTORNEY

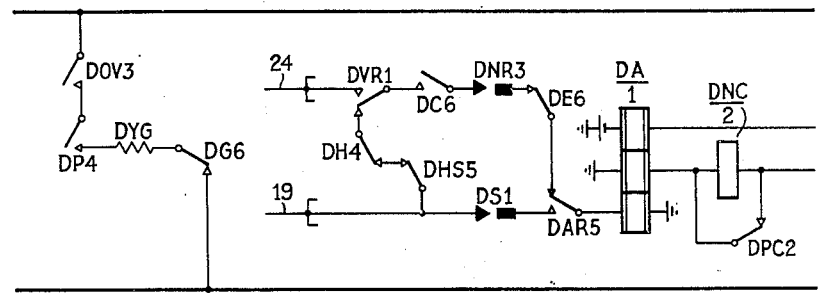
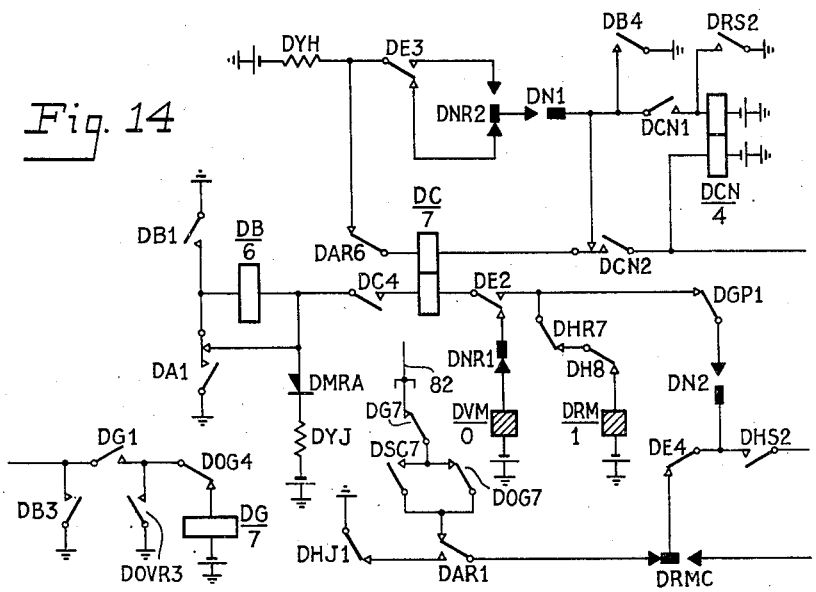
Fig. 14
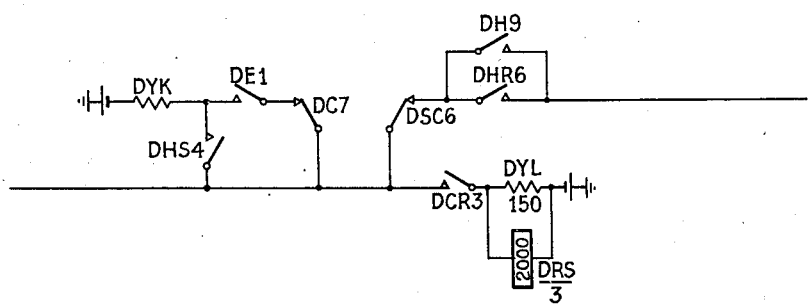
INVENTOR
GEORGE THOMAS BAKER
BY
ATTORNEY May 23, 1950  G. T. BAKER  2,508,636
TELEPHONE SYSTEM EMPLOYING CONNECTING SWITCHES HAVING
AUTOMATIC IMPULSING MEANS LOCAL TO THE CONNECTING
SWITCHES AND CONTROLLED BY THE CALLING LINES
Filed Nov. 11, 1944  18 Sheets-Sheet 16
Fig. 16
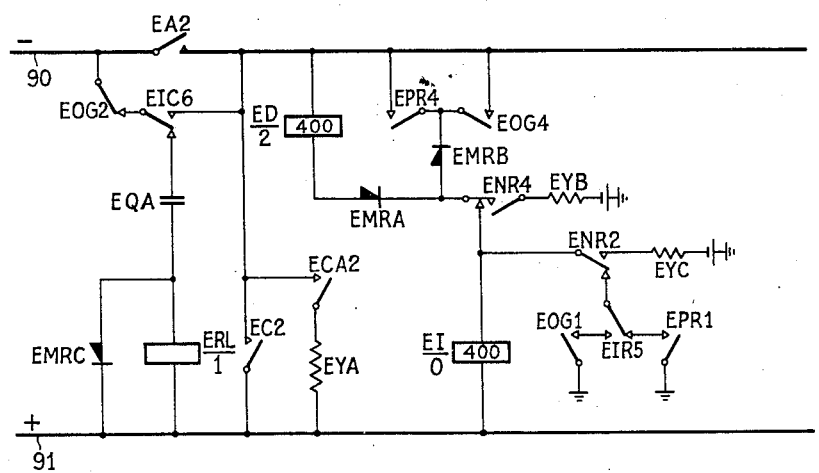
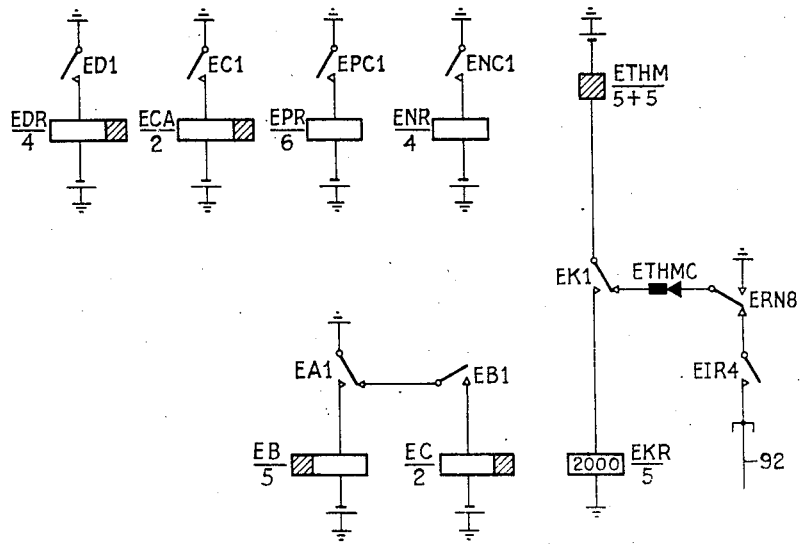
INVENTOR
GEORGE THOMAS BAKER
ATTORNEY Patented May 23, 1950

2,508,636

UNITED STATES PATENT OFFICE 2,508,636

TELEPHONE SYSTEM EMPLOYING CONNECTING SWITCHES HAVING AUTOMATIC IMPULSING MEANS LOCAL TO THE CONNECTING SWITCHES AND CONTROLLED BY THE CALLING LINES

George Thomas Baker, Liverpool, England, assignor to Automatic Electric Laboratories Inc., Chicago, Ill., a corporation of Delaware Application November 11, 1944, Serial No. 562,940
In Great Britain January 12, 1944

6 Claims. (Cl. 179—18)

The present invention relates to telephone systems, and as regards most of its features is particularly applicable to rural telephone networks involving a main exchange through which all calls incoming to or outgoing from the network are handled, and a number of outlying rural exchanges which serve in either a tandem or terminal capacity.

In such networks the various outlying exchanges are usually so small as to render a 24-hour manual service extremely expensive and inefficient, while with regard to possible automatic working, the subscribers' line conditions are often well below the standard required for satisfactory impulsing to automatic exchange equipment. A solution already proposed is to allow the subscribers' instruments to remain of the manual type and to provide automatic switching equipment in the various outlying exchanges which is controlled on a semi-automatic basis by an operator at the parent main exchange, the equipment in response to a signal from a calling subscriber being adapted automatically to connect such party with the main exchange operator. With such arrangements every type of call involving a small exchange of the network will require the intervention of the operator and this necessitates complex circuit switching arrangements. Further disadvantages which can be raised are slowness in operation, and restriction of network layout.

The chief object of the present invention is to provide an improved telephone system suitable for rural conditions which is far simpler and more direct than semi-automatic exchange working of the type mentioned above and which will operate over any subscriber's line which is good enough to enable manual signalling to be performed, i. e., good enough to enable a relay at an exchange to be operated or released.

According to one feature of the invention use is made of the automatic selecting principle disclosed in Patent No. 2,421,169, issued May 27, 1947, to Reginald Taylor and George Thomas Baker, which does not necessitate reception of dialled impulses or the like from a calling point, the selection of any one of a number of lines being initiated in response to a signal from a calling point, and proceeding until terminated by a further signal from the calling point when the desired line is encountered, the progress of the selecting operation being indicated continuously at the calling point, for instance audibly. Preferably, each step of an exchange selecting switch will be indicated to a calling party by means of a tone pulse applied to his line at the exchange.

This principle is employed in the various outlying exchanges of the rural telephone network and its use enables local calls to be set up without the intervention of the main exchange operator thus relieving the latter of a great deal of work, economising in junctions and rendering the local exchange more independent of outside conditions. A local call can thus be made even if the outgoing junction is out of order or engaged on another call. Where manual type subscribers' telephone instruments are already fitted, the modifications required to the instruments are extremely small and chiefly involve the addition of a controlling push button on or in association with each instrument.

For local calls a calling subscriber will remove his receiver and will depress his push button to initiate the operation of a selecting switch at the local exchange. When the requisite number of steps have been made by the switch as indicated by the number of tone pulses received, the operation of the switch will be terminated by releasing the push button. Similar remarks apply if a second digit has to be signalled, any hunting or automatic stepping of the switch which has to be performed after the initial positioning operation taking place before the second controlled selecting and corresponding tone signalling operation is performed. The calling party thus gains access to a required line and subsequently after the conversation is completed the connection is cleared when the subscriber hangs up.

For calls outside the local exchange a calling subscriber will signal a predetermined digit, preferably greater than any required for local service, whereupon a signal characterising "Out service" is automatically passed forward from the local exchange through to the operator at the parent main exchange, the signal being automatically repeated at any tandem exchange which may lie between the local exchange and the main exchange. The wanted "Out service" number is then given by the calling subscriber to the operator and if this is for a subscriber on an exchange on the originating route, the operator will insert her calling plug into a jack associated with the incoming line and will progressively dial back to set up the connection to the wanted party. When the operator has reached the wanted subscriber, a signal is passed forward from her position to connect together the calling and called subscribers and the operator can then listen in on the connection to determine that it is proceeding satisfactorily. When she clears out of the connection, the route as far as the junction point is cleared down and the release of the established connection is then under control of the subscribers in conversation.

With the circuit arrangements according to the present invention the facility whereby the operator can dial back over the originating route, although in itself not new, can be carried out in a much more straightforward manner as will be evidenced from the ensuing description from which other features of novelty will also appear.

Figure 2:
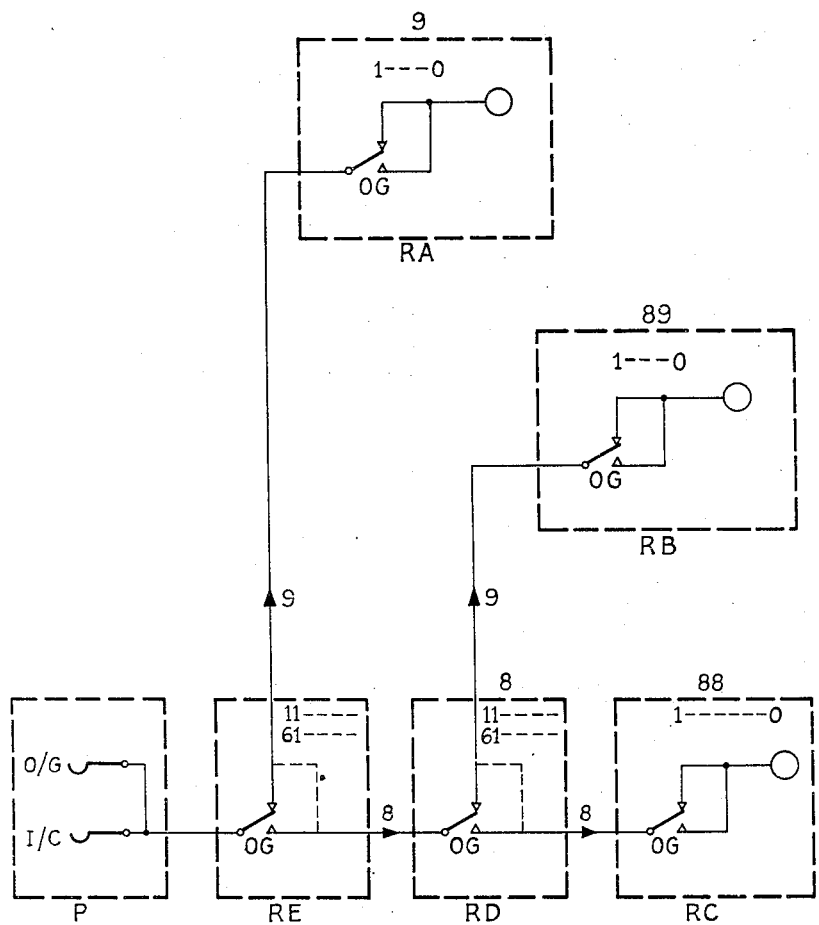
Figure 3:
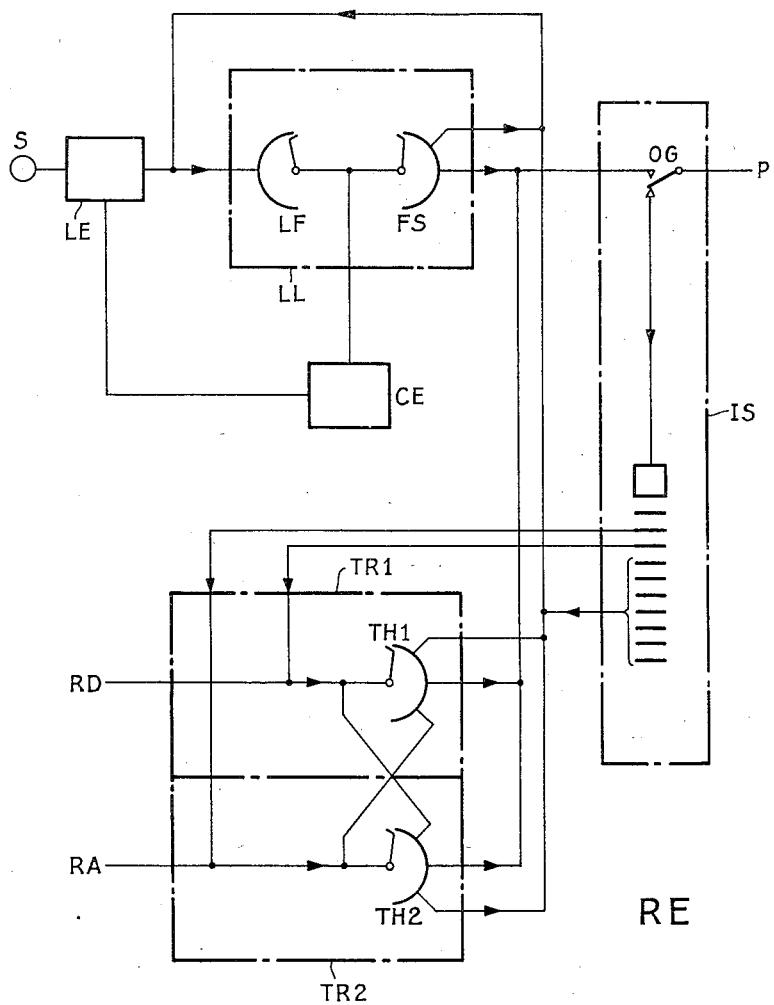

The invention will be better understood from the following description of one method of carrying it into effect, reference being had to the accompanying drawings comprising Figs. 1–18. Of these, Fig. 1 shows the layout of a typical rural telephone network, Fig. 2 shows diagrammatically a typical switching scheme for one arm of the network of Fig. 1, and Fig. 3 shows typical trunking arrangements at a tandem exchange, such as RE in Fig. 1.

Figure 4:
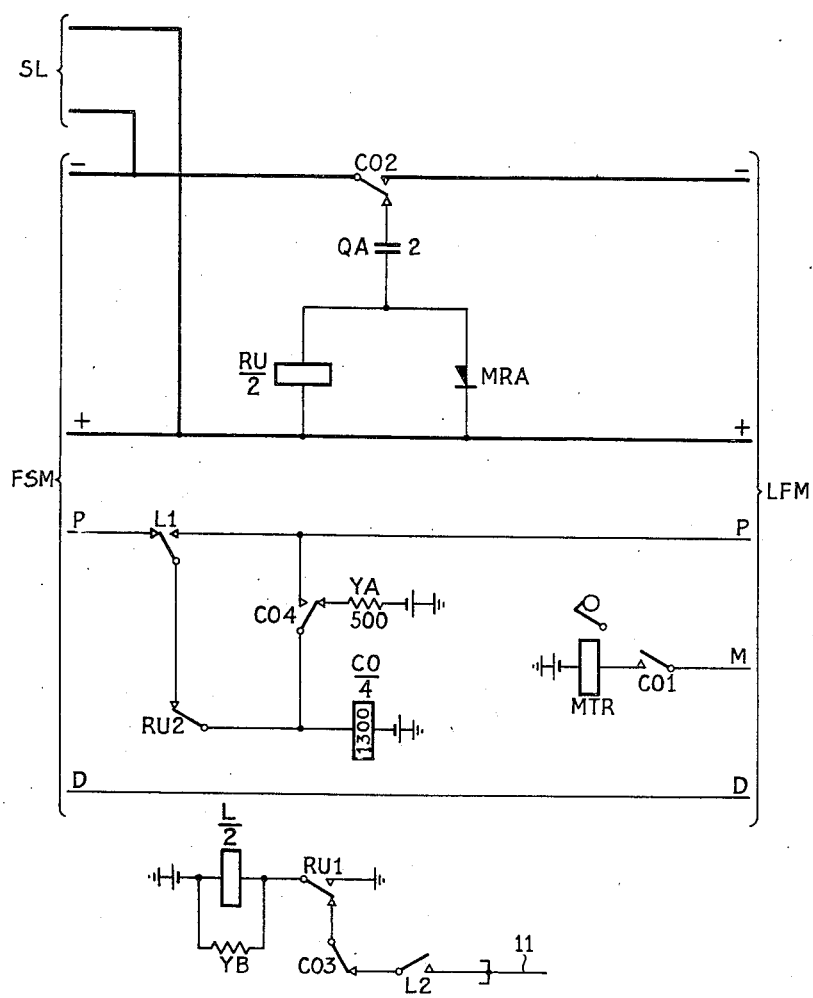

Fig. 4 shows a line circuit for a terminal or tandem exchange subscriber equipped with a magneto telephone instrument.

Figure 5:
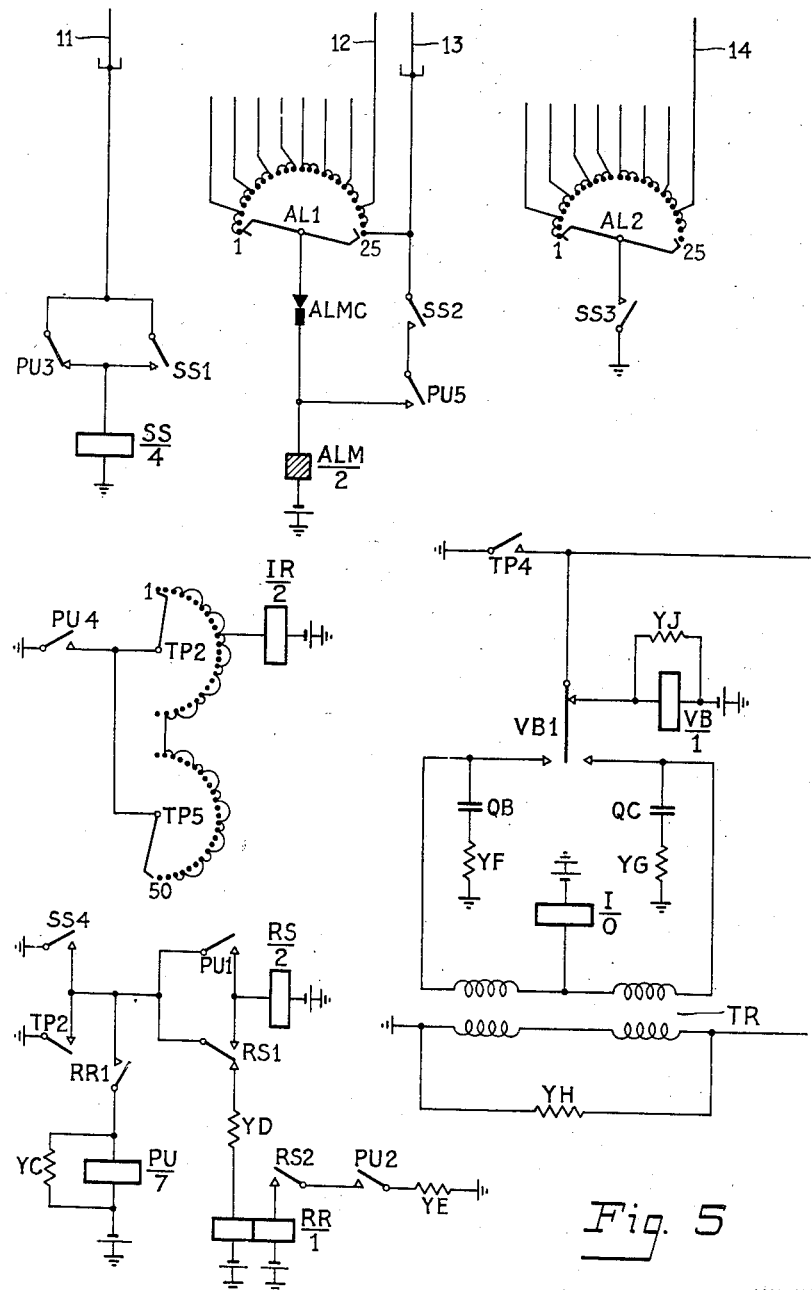
Figure 6:
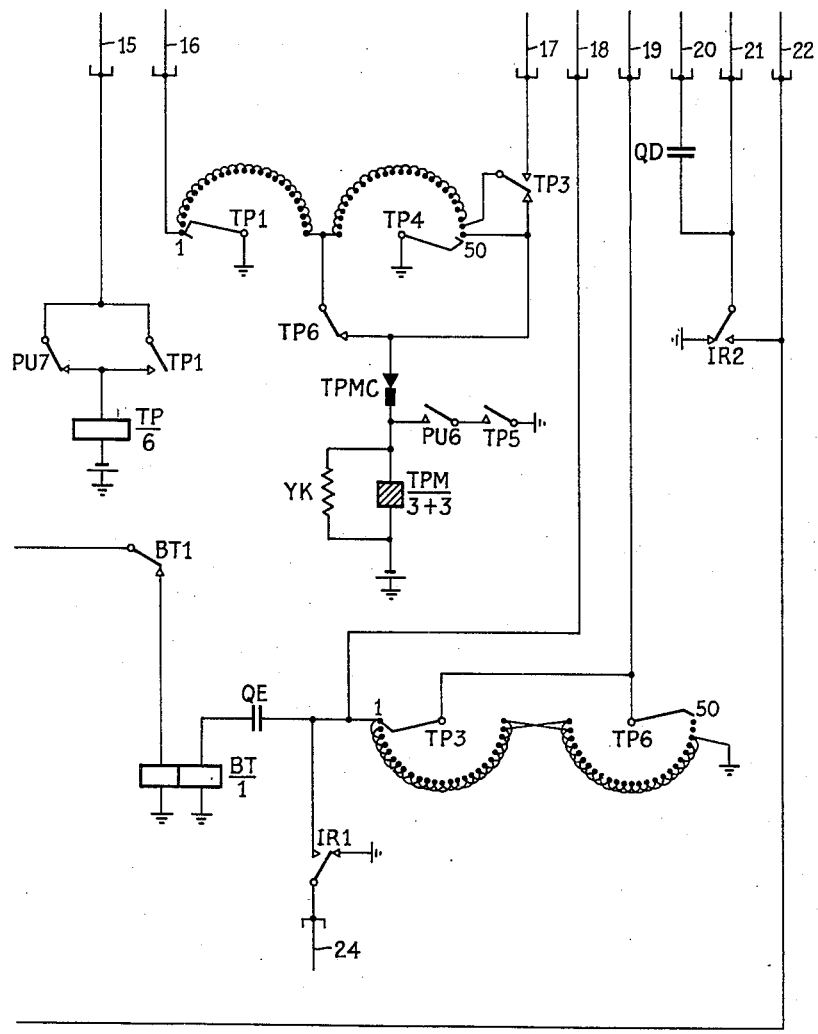

Figs. 5 and 6 when arranged side by side together show the circuit of the common equipment required for each of the automatic terminal or tandem exchanges of the network, this equipment serving to allot for use the various local finder/connector link circuits with which each such exchange equipment is provided and to generate ringing and other tones as well as timing pulses.

Figure 7:
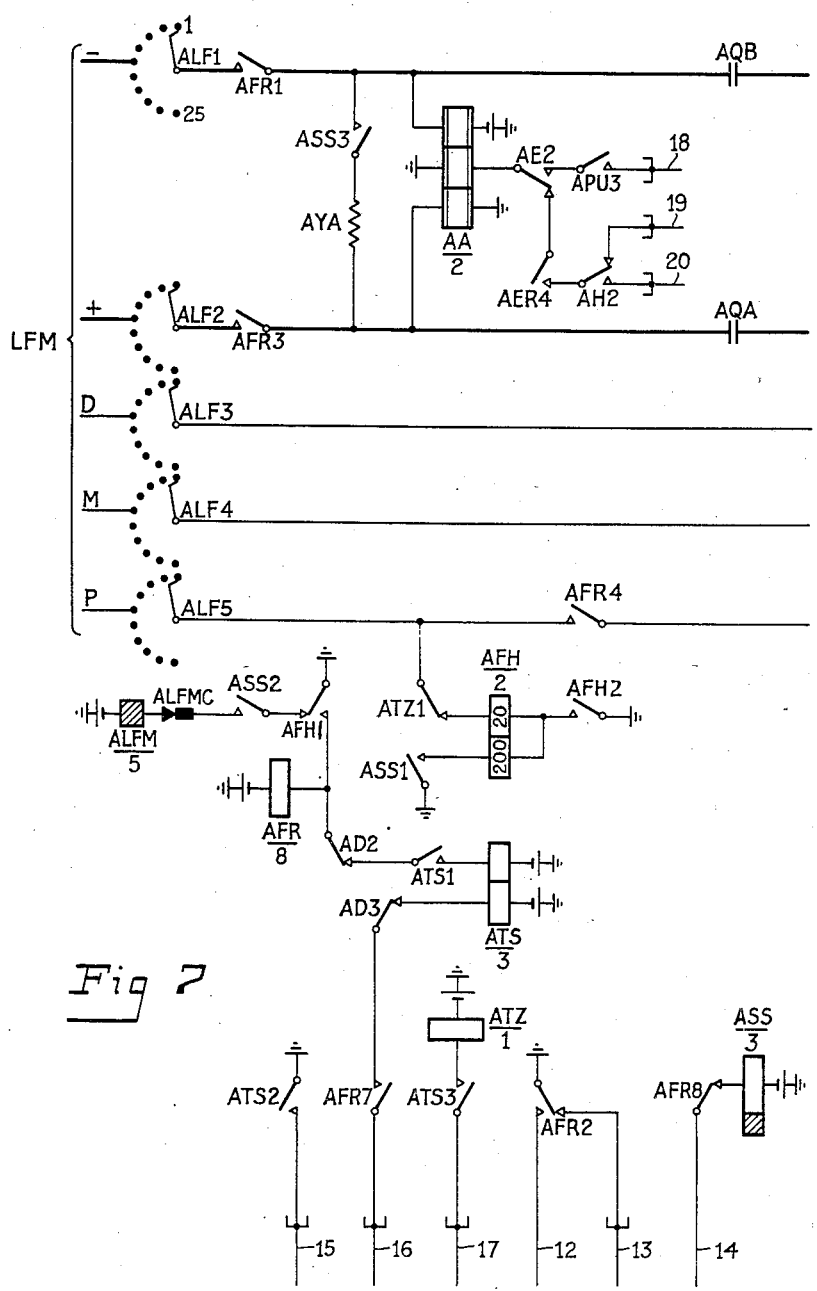
Figure 8:
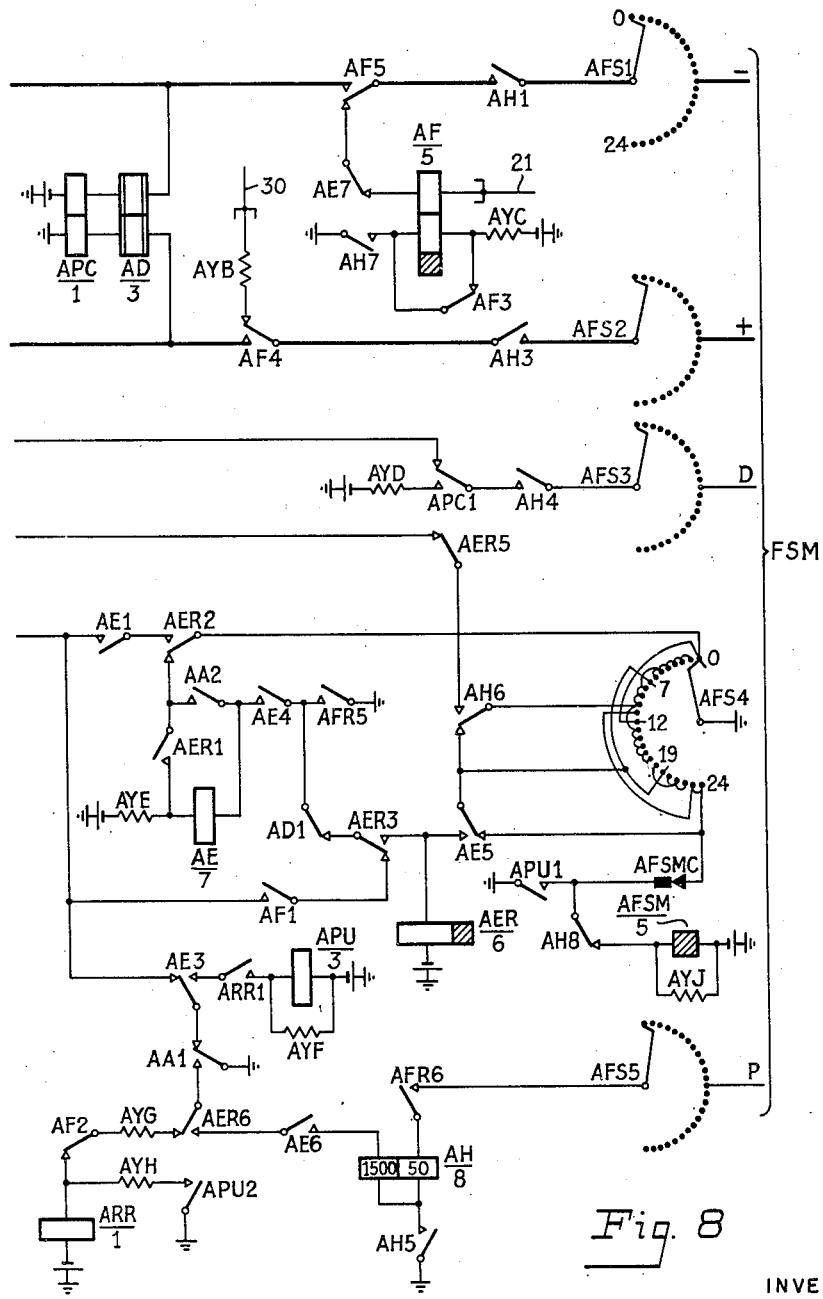

Figs. 7 and 8 when arranged side by side together show the details of a finder/connector link circuit of an automatic exchange capable of accommodating nine subscribers and one junction line, an exchange of this size being employed only as a terminal exchange.

Figure 10:
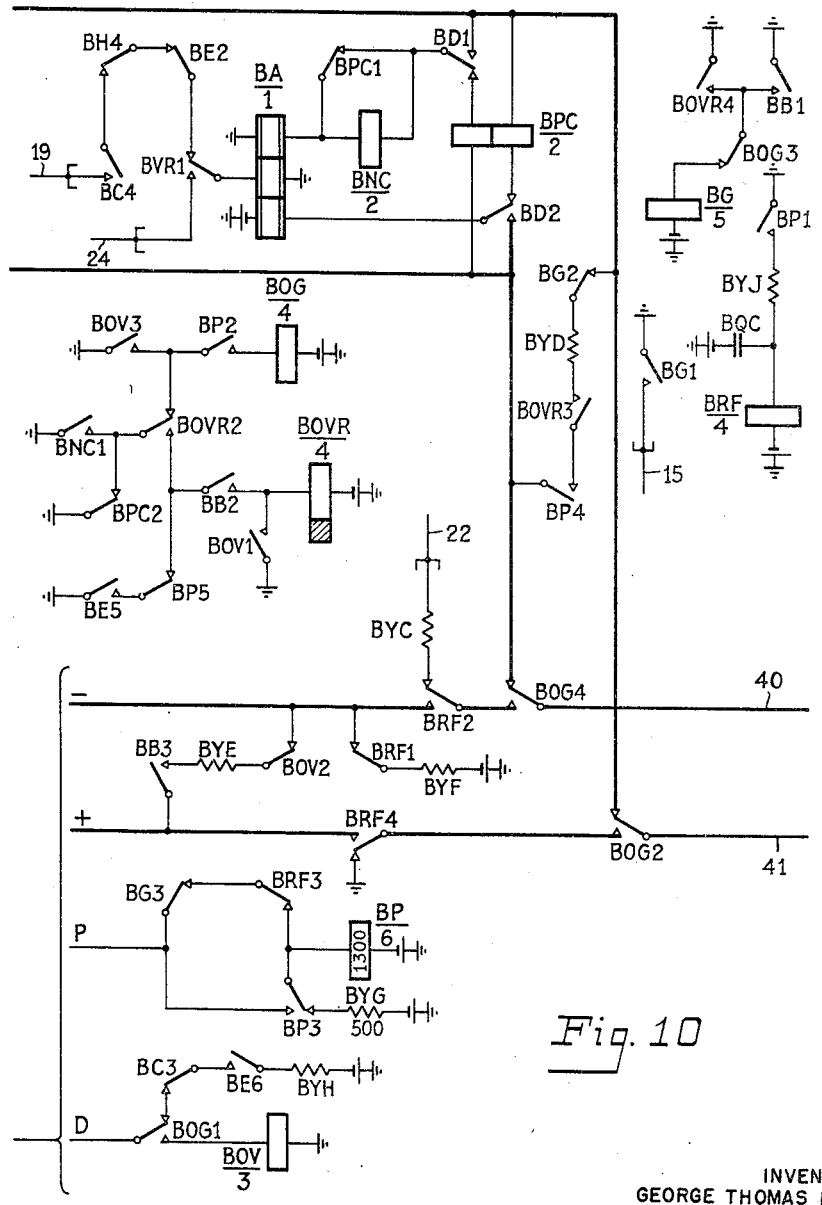

Figs. 9 and 10 when arranged side by side together show the circuit of the incoming selector of a terminal exchange.

Figure 11:
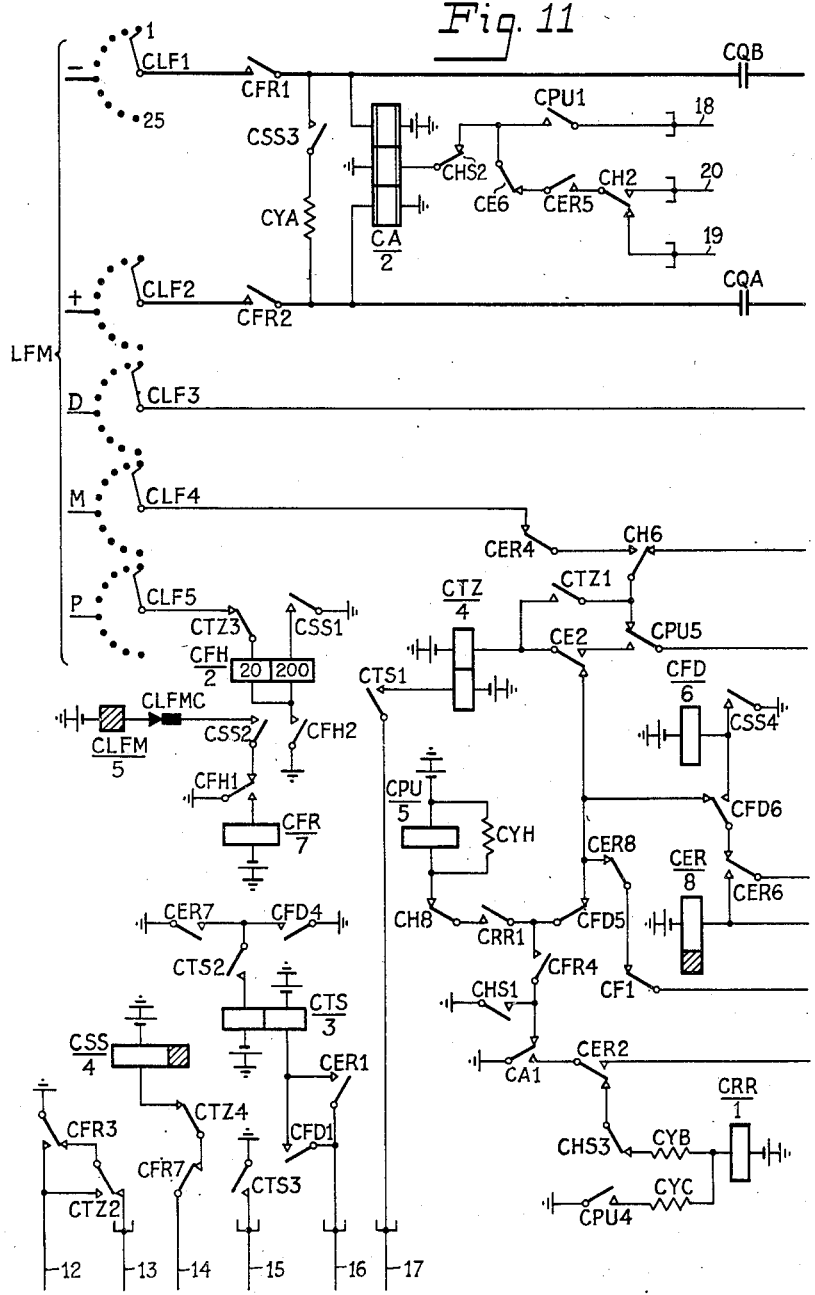
Figure 12:
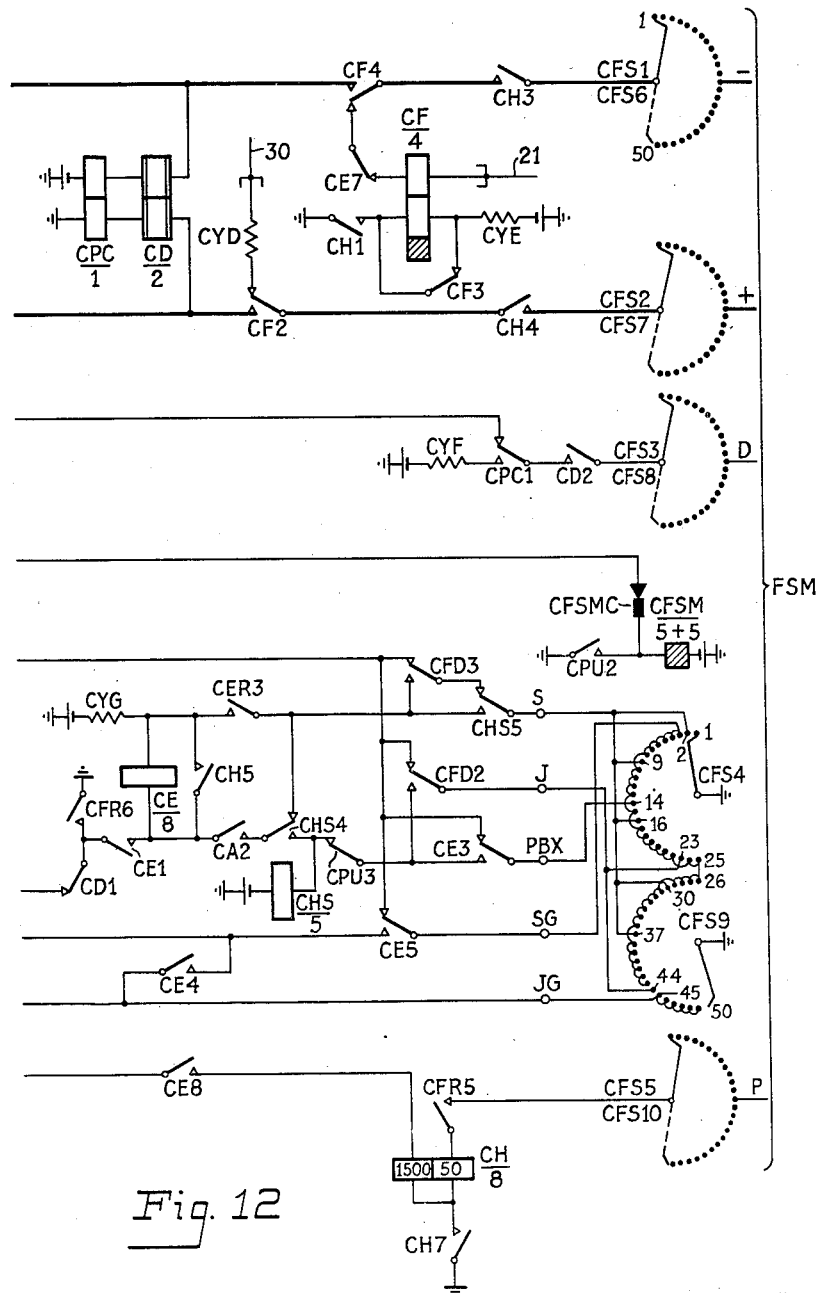

Figs. 11 and 12 when arranged side by side together show the circuit of a finder/connector link of an automatic exchange capable of providing for forty-two subscribers and seven junction lines, such exchange being capable of use either as a terminal or tandem exchange and having P. B. X hunting facilities.

Figure 13:
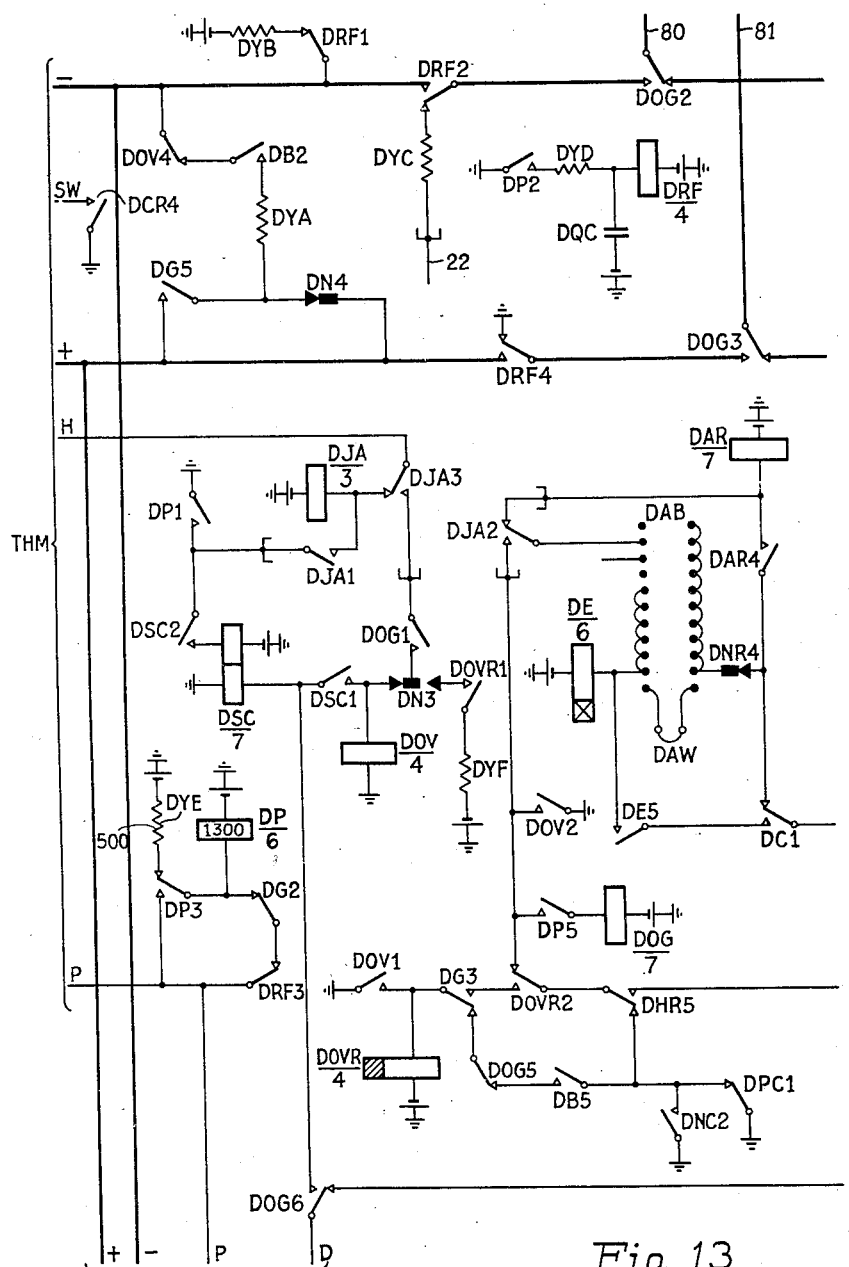
Figure 15:
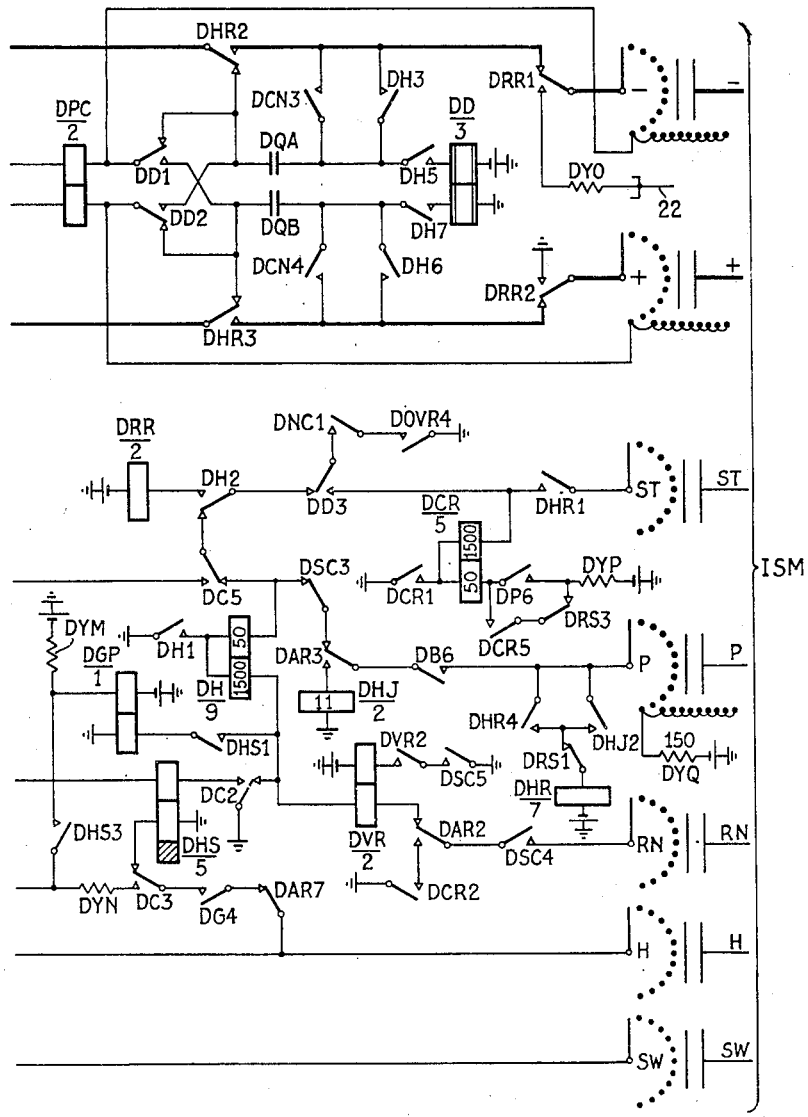
Figure 17:
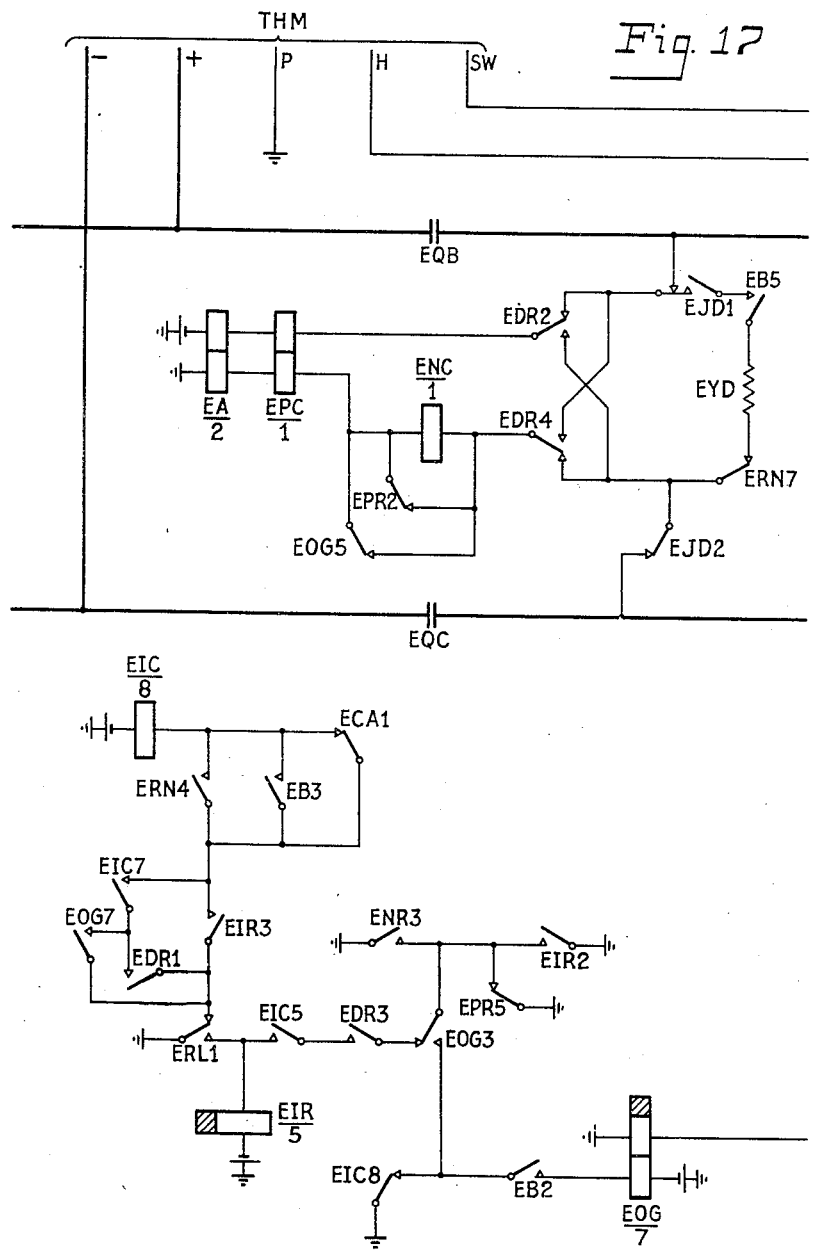
Figure 18:
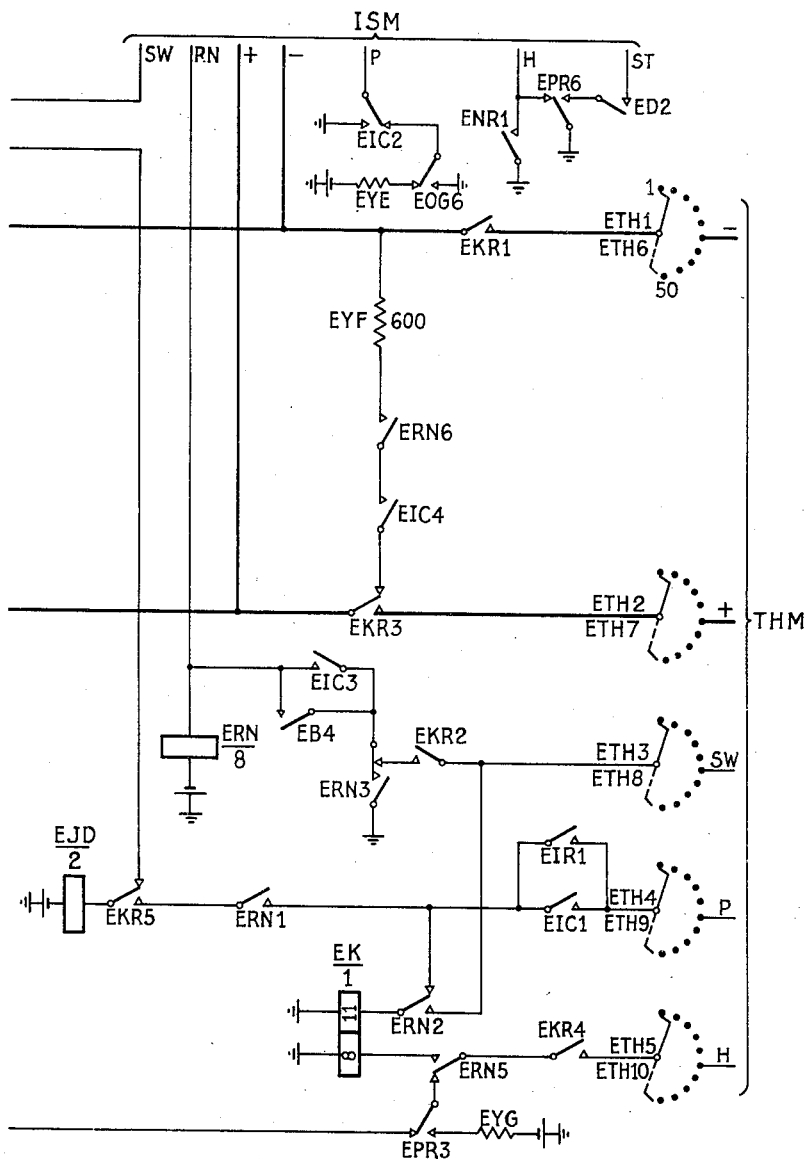

Figs. 13, 14 and 15 when arranged side by side together show the circuit of an incoming selector of a tandem exchange, while Figs. 16, 17 and 18 when arranged side by side show the circuit of a repeater of a tandem exchange.

The parent main exchange is assumed to be manual but it could of course operate on a normal automatic basis as far as local calls are concerned, all calls into the rural network being handled via an operator at this exchange.

Considering now the basis of operation of the system, although its technical functioning is novel, the main exchange operator need not be aware of this and will adopt the same procedure for setting up a call as for normal semi-automatic exchange working.

As previously mentioned, all local calls are set up automatically by the calling rural subscriber. All "Out service" inter-exchange calls are set up under control of the main exchange operator, such calls being virtually independent of the local switching parts of the rural exchange so that it is justifiable to consider the system as involving two quite distinct principles.

(a) Operator-controlled automatic dialling with reversion when required.

(b) Rural automatic exchange operation without dials at the individual stations.

In other words the rural exchanges may be visualised as independent units tapping in to an operator-controlled connecting network. The two portions will now be described independently, consideration first being given to the connecting network.

Referring first to Fig. 1, the parent main exchange is designated P and connects with a main exchange network over lines such as 10. Tandem exchanges in one arm of the rural network are designated RE and RD, while the terminal exchanges are designated RA, RB and RC.

Considering now a call incoming to the rural network from exchange P and referring to Figs. 1 and 2, each junction incoming to a rural exchange terminates on an incoming selector to the banks of which are connected the local subscribers' lines and also all outgoing junction lines. In the case of tandem exchanges the incoming selectors are of the two-magnet vertical and rotary type with so-called rectangular release while in the case of terminal exchanges uniselectors are employed as incoming selectors. In general, levels 1–6, or their equivalent on uniselector incoming selector banks, are allocated to subscribers and 7–0 to outgoing junctions. In the tandem exchanges two-digit numbers in the series 11–60 are allocated to the local subscribers while in the terminal exchanges single digit numbers 1–0 are employed.

Hence considering Fig. 2, by plugging into the jack O/G corresponding to the outgoing branch the operator is connected to the incoming selector at rural tandem exchange RE. By dialling one of the digits 1–6 followed by a second digit, the operator is connected to a subscriber on exchange RE. If 8 or 9 is dialled, the selector is caused to hunt for and seize a junction to exchange RD or RA respectively. These junctions again terminate on incoming selectors which can be dialled on to any of the subscribers on the exchange concerned, or in the case of exchange RD, 9 or 8 can be dialled giving access to exchange RB or RC. Hence this type of call involves plugging in and dialling the subscriber's number in a straightforward manner.

With regard to calls from a rural subscriber to the operator, to another branch of the network, or to an exchange outside the network, the digit 7 which is allocated to the operator is employed in all cases, and when this is signalled in accordance with the automatic selective principle mentioned previously, the call is immediately routed to the parent manual exchange P. For example, consider exchange RC, when 7 is sent, a relay OG therein is operated and the junction to exchange RD is seized. In this exchange a relay OG is operated and a junction to RE is taken. This operation is repeated automatically at RE and a calling signal is given adjacent the answering jack I/C at the parent exchange. If the operator on inserting an answering plug ascertains that the call is for another branch of the network, she inserts the calling plug into the appropriate outgoing jack and dials the number in the same manner as for the incoming call already described. If the call is outgoing from the network, it is extended over a line such as 10, Fig. 1, in usual manner.

In case of a call from one rural subscriber to another rural subscriber on either the same exchange or on a different exchange but on the same branch of the network, the operator is signalled as in the previous case. When the number requested is on the same branch, the operator inserts her calling plug into the outgoing multiple jack corresponding to the junction over which the call has been received, whereupon a signal is sent automatically to produce reversion to the incoming selector at the distant end of the junction. The call is then set up by dialling in the same manner as for the previous case, it being appreciated that to the operator there is no difference in the two types of call.

Thus, if in the above instance, a subscriber on the exchange RC is calling, when 7 is signalled the call reaches the operator in response to the energisation of the various OG relays in the path. When the operator plugs into the multiple jack, relay OG at the exchange RE is released, thus connecting the operator to the incoming selector. If the call is for exchange RA or RE, the setting of the selector takes place in the usual manner but if 8 is dialled indicating exchange RB or RD (a call for RC would have been completed locally automatically), relay OG at exchange RE is re-operated so that succeeding impulse trains are transmitted back over the junction over which the call was initiated. As soon as relay OG in exchange RE is re-operated, the corresponding relay in exchange RD is released thus connecting the junction to the incoming selector at this exchange. This reverting sequence can be carried out as many times as necessary.

When the call has been completed to the wanted subscriber, the operator will throw a signalling key. This has the effect of connecting up the two subscribers by the shortest path, e. g. if the call is from exchange RC to exchange RB, the operation of the key sets up the dotted connection shown in exchange RD. As long as the answering and calling plugs are left in, the operator continues to be coupled to the connection for monitoring purposes. When she is assured that conversation is taking place satisfactorily she withdraws the plugs, thus releasing the junctions to exchange RD.

If the operator wishes to release the portion of the call she has set up by dialling, she withdraws the calling plug, leaving the answering plug inserted. This has an "as you were" effect and reconnects her via OG relays all operated to the calling subscriber. By re-inserting the calling plug conditions for dialling are re-established.

Considering now the arrangements for calling number verification, which is necessary in view of the fact that on all calls outside the local exchange the operator records the charges, a calling subscriber originating such a call will therefore pass forward his own number. To enable this to be verified, the operator inserts her calling plug into the multiple jack and dials the given number as though she were setting up a call to the number. The revertive dialling sequence already described takes place right back to the calling subscriber and uses only the junctions over which the call was set up. Alternatively, the operator can simply throw a verification key which gives the same necessary control effect at the rural exchanges as does the insertion of the calling plug into the multiple jack of a calling rural network junction. If the calling subscriber is reached, a special tone is heard indicating that the number given was correct. This tone can only be secured by dialling back to the particular subscriber who is calling the operator and is obtainable even if the subscriber is part of a P. B. X group. To release a verification call the operator either withdraws the calling plug or restores her verification key.

As regards the rural automatic exchanges, in the subscribers' telephone instruments, which in the ensuing circuit description are assumed to be of the magneto type, a single-break push key short-circuited by a condenser is inserted in series with the line and may be fitted, if required, external to the telephone either as a wall mounting or as a loose cord connected item lying on a desk. This unit requires very little maintenance and that of an almost unskilled nature.

The local exchange is called by lifting the handset and turning the generator, whereupon at the end of the alternating current generation a local finder/connector link is caused to associate itself with the calling line and is then held from the calling party's loop. Certain types of telephone might require a minor wiring modification to ensure this procedure being effective. The receiver is then placed to the ear and the signalling button is depressed. Short pulses of tone which are delivered from the local link as its connecting switch performs its selecting operation are now heard in the receiver and these are counted until a number corresponding to the wanted line has been heard. The button is then released and ringing tone or busy tone will be heard exactly as in normal automatic working.

Where two digits have to be signalled, the button is released after counting out the first digit, then re-depressed to signal the second digit. The pulses are sent out at a comparatively slow rate so that no difficulty is experienced in stopping the selector at the appropriate point. This method will function quite satisfactorily on loops of up to 3000 ohms, and since the usual A, B and C dialling relays are unnecessary and the magnets have ample time to energize, the system is very robust.

Referring now to Fig. 3 which shows trunking arrangements of a tandem exchange such as RE of Fig. 1, the upper portion shows a typical line equipment LE together with a local link LL and associated common equipment CE. Local calls are set up on link LL by the subscriber in a straight-forward manner by the signalling of any of the two-digit numbers 11–60. If 7 is signalled, the connector side of the link operates to select an outgoing junction to the main exchange in which case relay OG is operated to effect switching through from the local link and at the same time to disconnect the incoming path from the junction to the incoming selector IS. If the call is being set up from one of the remote exchanges RA or RD, the uniselector TH1 or TH2 shown in the tandem repeater TR1 or TR2 hunts to find an outgoing junction to exchange P.

Assuming now that a subscriber on the tandem exchange RE is calling a subscriber on a remote exchange such as RA or RD, the call goes through to the operator at exchange P as described, and she thereupon plugs into the outgoing jack to release relay OG. The incoming selector IS is dialled up on to level 9 or 8 which gives access to the junction required and further impulses are sent to reach the desired subscriber. When the latter is obtained, the operator operates a signalling key. This signal into the tandem exchange to cause the calling subscriber's line to be identified by a marking extending through the local link connector FS and line finder LF, and the uniselector in the tandem repeater TR1 or TR2 attached to the junction to the remote exchange then hunts for this marking. When this is reached, the local link is released but the operator remains on the line via the incoming selector until she is assured that the conversation is proceeding correctly. She then withdraws her plugs and causes the release of the junction and incoming selector, the only equipment then being held at exchange RE being the tandem repeater.

Similarly in the case of a call from a remote exchange to a subscriber on the tandem exchange, the tandem repeater uniselector hunts to find the parent exchange junction and to operate relay OG. The operator plugs into the calling jack, releases relay OG and dials up the wanted subscriber. Thereupon the signalling key is thrown and the tandem repeater is caused to hunt for the called subscriber, thus time marked directly from the incoming selector bank. The incoming selector is released after monitoring as before.

On a call from remote exchange to remote exchange both connected to the same tandem exchange, the tandem repeater uniselector hunts to find the called junction marked on the incoming selector in a similar manner to the subscriber marking.

On all calls set up by the operator, trunk offering, breakdown and controlled ringing are provided. P. B. X hunting is available on the two-digit 42-line exchange, both over a large P. B. X group obtained by signalling a single digit and over a small group reached by two digits. In all calls not involving the operator, first-party release of the connection is provided since the usual "called subscriber held" alarm is unsuitable for unattended situations.

A private wire control facility may also be provided to enable an operator to dial on to a subscriber's line to supervise or assist him in the making of a call.

A "test call" unit can be provided which enables the operator or a test clerk at the parent exchange to set up a call from any exchange in the network back to the parent exchange. This unit utilises exactly the same equipment as the subscriber and functions on the lines of the well-known "faultsmen's ring back" circuit.

Considering now the detailed circuit operation, typical values for certain relay winding and resistors are given for general guidance, the supply voltage being assumed to be 50 volts.

Referring first to the subscriber's line circuit of Fig. 4, when the subscriber lifts his receiver to loop his line SL and then turns the handle of the generator, relay RU, which is responsive to alternating current by virtue of capacitor QA and arectifier MRA, is operated and operates relay L but prevents its contacts being effective. When the ringing has ceased, the line SL remains looped and relay L remains locked via contacts L2 and common lead 11 to a battery-connected start relay SS in the common equipment, Figs. 5 and 6, this circuit extending a start condition to the common equipment which causes a local link line finder to hunt for the battery marking placed on the P bank in the finder multiple LFM by contacts L1. When the finder reaches the line, relay CO is energised over the P conductor and disconnects relay L and extends the line SL through to the local link.

On an incoming call, relay CO is operated directly over the connector multiple FSM from the P normal lead to disconnect relay RU. The 500-ohm resistance across CO is to ensure the quick and effective action of the switching relay in the calling local link.

Considering now the common equipment of Figs. 5 and 6, the allotter uniselector AL, Fig. 5, which gives access to up to eight local links, will be normally resting on a free local link since the earth extended back from busy local links over leads such as 12 causes the uniselector magnet ALM to self-drive via interrupter contacts ALMC over busy outlets, each of which connects with three successive contacts on the AL switch banks. If all the links are busy, earth is removed from the overflow common 13 and so causes the uniselector AL to rest on the last contact.

The operation of relay SS from a calling line circuit extends on earth via bank AL2 to cause the preselected local link to hunt for the calling line. Relay SS at contacts SS4 also causes the rhythm relay RR, of the type disclosed in British Patent No. 518,877 to swing across and make its single pair of contacts. This energises relay PU which at contacts PU5 completes a circuit from earthed lead 13 for the allotter magnet ALM and at contacts PU1 energises relay RS which at contacts RS1 locks up and breaks the original pullover circuit of relay RR and at contacts RS2 gives it a pulse in the reverse direction to cause it to swing back and so to break the circuit of relay PU. The swinging action of relay RR is timed at .75 of a second and at each swing a pulse is given to uniselector magnet ALM and also to the rhythm relay itself to keep it swinging. Hence, in not less than 1.5 seconds the allotter will move off the selected link. This time is sufficient for the local link finder to make one complete revolution and finding should be achieved by that time. If not, this indicates a fault condition and the need for a second link to be automatically started up which occurs when the allotter steps to the next link. If this or any succeeding link is busy it is passed over rapidly by self-interrupted stepping. If finding does not take place normally, earth is extended on to bank AL1 from the link and causes the allotter to move on to the next outlet.

The rhythm relay RR, by the intermediary of relay PU, also controls the stepping of the time pulse uniselector TP, Fig. 6. This stepping is initiated on the operation of relay TP from a start condition over lead 15 from the link circuit and is subsequently effected by means of contacts PU6 and TP5. While switch TP is in the home position, earth is applied by wiper TP1 to the "S" pulse lead 16 and in stepping at the rate of one step per .75 second wiper TP4 reaches the Z pulse contact 49 extending to the "Z" lead 17 after 48 steps, i. e. 36 seconds. Relay TP at contacts TP4 also provides the ringing and tone start by energising the ringing vibrator relay VB and the busy tone relay BT, while at contacts TP2 it maintains the RR, PU and RS interacting circuit independently of contacts SS4.

An S pulse is a ground application to lead 16 by way of wiper TP1 (Figure 6) when the time pulse uniselector is in the home position, and is for the purpose of operating relay ATS of the hunting finder by way of contacts AFR7 when the finder wiper ALF5 has seized the calling line and thereby caused the operation of relay AFR. Relay ATS applies ground potential to lead 15 by way of contacts ATS2 to operate relay TP, and relay TP through contacts TP5 and PU6 completes an operating circuit to magnet TPM which is then controlled by the interaction of RR, PU and RS. An S pulse may, therefore, be considered as a starting pulse for the time pulse uniselector (Figure 6).

A Z pulse is a ground application delivered by way of contacts TP3 (Figure 6) when wiper TP4 has reached contact position 49, and is for the purpose of causing relay ATZ of the occupied finder to thereupon operate. If the calling subscriber fails to signal by this time, or if the called subscriber has not answered by this time, relay ATZ in operating will open the holding circuit of finder relay AFH at contacts ATZ1, thereby causing a forced release. A Z impulse may, therefore, be considered as a pulse which terminates a predetermined time interval for causing a forced release under the conditions outlined in this paragraph.

Vibrating relay VB in known manner supplies ringing current to the "continuous ringing" lead 22, while relay BT supplies "number unobtainable" tone to lead 18. Furthermore since the switch TP steps once every .75 second alternate contacts on banks TP3 and TP6 can be used to break up the continuous tone provided by relay BT into the off and on tone used for busy, which is applied to common lead 19. Contacts PU4 and wipers and banks TP2 and TP5 operate relay IR for two brief periods of approximately 0.3 second in each three second cycle, and this relay at contacts IR1 provides a verification tone over common lead 24 and at contacts IR2 provides interrupted ringing current over common lead 21 and also interrupted ringing tone via capacitor QD over common lead 20.

Referring now to the 9+1 terminal exchange local link circuit of Figs. 7 and 8, when the link is seized from the allotter by the extension of earth over lead 14, relay ASS is energised and thereupon at contacts ASS1 provides a testing circuit for relay AFH, at contacts ASS2 provides a driving circuit for the line finder switch magnet ALFM and at contacts ASS3 brings up relay AA. Relay AA in operating, at contacts AA1, Fig. 8, causes rhythm relay ARR to swing its armature away from its contacts ARR1, as distinct from relay RR in Fig. 5 which closed its contacts on energisation, and at contacts AA2 brings up relay AE from either of the two home positions 0 or 12 of the connector switch bank AFS4. Relay AE in operating at contacts AE3 prepares an operating circuit for relay APU.

When the finder switch ALF reaches the calling line which is marked by battery potential on bank ALF5 by way of resistor YA and relay CO, Fig. 4, relay AFH energises over its two windings in series and thereupon at contacts AFH2 applies guarding and holding potential to the outlet seized, while at contacts AFH1 it brings up relay AFR and disconnects the switch driving circuit. Relay AFR in operating, at contacts AFR1 and AFR3 switches through the speaking conductors to relay AA, at contacts AFR2 disconnects earth from the overflow common lead 13 and also applies earth to lead 12 so as to step the allotter switch in the common equipment on to another free local link in readiness for further local calls, at contacts AFR5 completes an alternative holding circuit for relay AE, at contacts AFR7 energises relay ATS from the time pulse "S" lead 16 and at contacts AFR8 disconnects relay ASS. Thereupon at contacts ASS3 the local holding circuit for relay AA is opened, but this relay now remains held over the calling party's loop. Relay ATS in operating locks over its upper winding and at contacts ATS2 applies earth to the time pulse and ringing current and tone generation start lead 15, while at contacts ATS3 it connects relay ATZ on to the "Z" lead 17.

When the subscriber operates his signalling button to initiate the selecting operation, the direct current calling loop is opened and relay AA releases, whereupon at contacts AA1 relay ARR is allowed to swing back and make its contacts ARR1 thus operating relay APU. Relay APU in operating, at contacts APU1 energises the connector switch magnet AFSM and at contacts APU2 gives a small energisation to relay ARR to ensure the continuation of the swinging movement, while at contacts APU3 it extends "number unobtainable" tone via common lead 18 and the windings of relay AA to the calling party, this tone being utilised for selective signalling purposes. When rhythm relay ARR opens its contacts, relay APU releases and de-energises the connector switch magnet and at the same time opens the tone circuit, the subscriber having received a pulse of tone corresponding to one step of the connector switch. Relay APU in releasing de-energizes relay ARR which thereupon swings back to reclose its contact ARR1 and the cycle of operations thus repeats itself, the calling subscriber receiving a tone pulse for each step of the connector switch. Immediately the connector switch leaves its home position, wiper AFS4 extends earth via contacts AH6 and AE5 to bring up relay AER and this relay at contacts AER1 prepares for the short-circuiting of relay AE, at contacts AER3 locks itself and at contacts AER6 prepares a testing circuit for relay AH.

When the signalling button is released after a number of tone pulses have been received appropriate to the number required, relay AA reoperates and at contacts AA1 opens any further circuit for relay APU and so halts the stepping, while at contacts AA2 it short-circuits relay AE which commences to release slowly. During the release time of relay AE, a testing circuit is completed via contacts AA1, AER6, AE6 and AFR6 for relay AH over wiper and bank AFS5 on to the P normal lead of the called subscriber.

If this subscriber is free, relay AH energises in series with the called subscriber's cut-off relay CO and resistor YA, Fig. 4, and on the release of relay AE initiates ringing of the called party's bell via common lead 21 and relay AF, a return circuit being completed via resistor AYB and lead 30 to battery, while at contacts AH2 ringing tone from common lead 20 is supplied to the calling party.

When the called party replies, relay AF operates to trip the ringing and switch the speaking leads through, whereupon relay AD operates over the called party's loop in series with the differential relay APC which is non-operative in this condition. Relay AD in operating, at contacts AD2 and AD3 opens the time pulse circuit for relay ATS and at contacts AD1 opens the circuit of relay AER which on restoring after its slow period at contacts AER4 opens the ringing tone circuit and at contacts AER5 extends earth for metering from wiper and bank AFS4 over contacts AH6 to the M lead of the calling party's line circuit. It will be noticed that contacts 7 and 19 corresponding to the digit 7 which is used to give access to the outgoing junction to the main exchange are not wired to the metering circuit, hence on calls via the main exchange operator no recording is made on the calling party's meter.

Relay AH in operating also completes a through circuit between the bank ALF3 of the line finder switch and the corresponding bank AFS3 of the connector switch. The functions both of this path and of relay APC will be discussed later in connection with operator calls to the incoming selector of Figs. 9 and 10.

If the called subscriber is busy when the connector comes to rest on his line relay AH will fail to operate during the release period of relay AE and hence on the release of relay AE, busy tone will be returned to the calling party via lead 19 and contacts AH2, AER4 and AE2.

Considering now the various possible release conditions for the local link, if the calling party hangs up without signalling, this is equivalent to operating but not releasing the signalling button. Under this condition the connector switch continues to step until it arrives at its next home position, say 12 in this instance, whereupon a circuit is completed to shunt down relay AFH via wiper and bank AFS4 and contacts AER2, AE1 and AFR4. Relay AFH in releasing releases relay AFR which brings down relays AE and AER and all relays are then normal.

Under normal release conditions, when the calling party hangs up, relay AE will already be normal so that relay AA in releasing will bring down relay AFH by short-circuiting via contacts AA1, AE3 and AFR4. Relay AFH in releasing brings down relay AFR which then releases relays AH, AF and AD. On the release of relay AH, a self-interrupted circuit is completed for magnet AFSM over wiper AFS4 and the connector switch is advanced to its next normal position. In case the called subscriber hangs up first, relay AD in releasing will at contacts AD1 extend a short-circuiting earth back via contacts AFR5, AD1, AER3, AF1 and AFR4 to relay AFH with similar results as for the calling party release.

Under time pulse release conditions, if the calling subscriber has failed to signal by the time the Z pulse is received over lead 17 or if the called subscriber has not answered in this time, relay ATZ in operating will release relay AFH at contacts ATZ1 and the other relays then release in turn.

Referring now to the terminal exchange incoming selector circuit of Figs. 9 and 10, this is employed on all calls other than local calls.

On an incoming call from the main exchange, the loop extended forward from the operator over the junction conductors 40 and 41 either directly or via an intermediate tandem exchange, brings up relay BA in series with differential relay BPC which is non-operative at this time. This is followed by the energisation of relays BB, Fig. 9, BG, Fig. 10, BC and BE, Fig. 9, and BOVR, Fig. 10 in turn, whereby access from the local link circuit (shown in schematic form in the left-hand lower corner of Fig. 9) is busied at contacts BG3 by the disconnection of the idle marking battery potential via the winding of relay BP in parallel with resistor BYG and the impulsing circuit is prepared at contacts BE4 and BG5 via the low resistance lower winding of relay BC to the selector switch magnet BSM.

When the operator dials a digit corresponding to the number of the wanted party on the terminal exchange, relay BA in responding to the impulse train repeats impulses to the selector magnet BSM, whereupon the switch wipers are stepped round the banks accordingly. During the impulse train relay BB holds operated due to its slug and relay BC holds operated by virtue of its upper winding being short-circuited via contacts BG4 and BCN4, upper winding of relay BC and contacts BE3 and BSMC to earth via bank and wiper BS5.

At the end of the impulse train, relays BA and BB remain held and relay BC releases slowly. On the release of relay BC, a testing circuit is completed for the two windings of relay BH in series via wiper BS3 on to the P normal lead of the called line, while at the same time the circuit of relay BE is opened and this relay commences to release slowly.

If the called line is free, relay BH operates and at contacts BH1 and BH3 switches the incoming junction line through to the called subscriber's line, the operator receiving no tone in this instance. The operator may now ring the wanted party by extending a battery unbalance signal forward over the junction line, this signal comprising the connection of battery potential to both speaking wires. In response thereto relay BA remains held and relay BPC is operated and at contacts BPC1 removes the short-circuit from relay BNC which operates in series with the signalling battery. Relay BNC at contacts BNC1 prevents the release of relay BOVR due to the opening of contacts BPC2 and at contacts BNC2 operates relay BRR, whereupon at contacts BRR1 and BRR2 continuous ringing current via common lead 22 is applied to the called line. After a short application of ringing, the unbalance signal is removed and hence when the wanted subscriber lifts off his receiver, he may converse with the operator via the incoming selector circuit which remains guarded against access from the local link so long as the operator maintains the connection. On the answering of the called party, relay BD operates and at contacts BD1 and BD2 reverses the battery potential applied to the junction line so as to give supervision to the operator.

If the wanted party is busy, relay BH will fail to operate during the release of relay BE and hence when the latter releases and in so doing re-operates relay BC by removing the short-circuit from its upper winding, busy tone will be extended via common lead 19 and the windings of relay BA to the operator.

The operator may now offer the call to the engaged party by extending a battery unbalance signal which operates relay BPC which in turn brings up relay BNC as before. This time, since relay BH is normal and relay BC is operated, relay BNC in operating will at contacts BNC2 extend earth via contacts BH2 and BC5 to bring up relay BCN. Relay BCN locks over its lower winding at contacts BCN2 and at contacts BCN4 holds relay BC so long as the unbalance signal remains applied. At contacts BCN1 and BCN3 it connects the junction line via capacitors BQA and BQB through to the required line.

The parties in conversation are now advised by the operator to hang up and the unbalance signal is removed from the junction, whereupon relays BPC and BNC restore, while relay BC also restores but relay BCN remains held. A reapplication of the unbalance signal now completes a breakdown circuit, relay BNC in re-operating at contacts BNC2 now applying a full earth via wiper and bank BS3 to shunt down any local link finder or connector switching relays already connected to the P normal lead of the called subscriber. When the unbalance is removed, relay BH operates over its windings in series in usual manner and a subsequent application of the unbalance signal brings up relay BRR to apply ringing current to the called subscriber in the same way as if the subscriber were originally idle.

When the called party hangs up, relay BD releases and by reversing the current over the junction back to normal gives the operator a clearing signal. When she removes the plug, relays BA, BB, BOVR, BG, BH and BC or BCN release in turn and the switch BS is restored to its home position.

On an outgoing call when a local subscriber signals the number 7 corresponding to the outgoing main exchange junction circuit, the switching relay AH, Fig. 8, in the local link circuit will switch in to relay BP in parallel with resistor BYG. Relay BP in operating brings in relays BOG and BRF, the latter being slow to operate by virtue of the series resistor BYJ and shunt capacitor BQC. During its energising time a ringing pulse is extended forward from common lead 22 over the junction leads 40 and 41 to seize the equipment at the main exchange end of the junction since contacts BOG2 and BOG4 are operated. The ringing pulse is repeated at any intermediate tandem exchange if necessary as will be described in detail subsequently. Ringing from the local link will have been tripped by resistor BYF which is connected to the negative speaking conductor until relay BRF operates.

When the operator plugs in to the calling junction, she will ascertain the number both of the required party and also of the calling party for verification purposes.

To effect verification the operator dials up the call back along the train as will be described later and when the junction 40, 41 into the terminal exchange is seized a momentary battery unbalance is extended back thereover to the calling local link to operate relay APC, Fig. 8. This thereupon extends a battery potential forward by way of resistor AYD, contacts APC1 and AH4, wiper and bank AFS3 and the D wire to bring up relay BOV, Fig. 10. Relay BOV in operating brings up relay BOVR at contacts BOV1, whereupon at contacts BOVR3 a local operating circuit is completed for relay BA via resistor BYD, whereupon relay BB operates. Relay BOVR also at contacts BOVR2 completes a locking circuit for itself and opens the original operating circuit for relay BOG but this relay remains held over contacts BOV3 until the unbalance signal is removed. When the signal terminates, relay APC, Fig. 8, releases and in turn releases relay BOV and hence relay BOG. Relay BOG in returning to normal at contacts BOG3 operates relay BG, whereupon relays BC and BE also operate, and at contacts BOG2 and BOG4 reconnects the junction to relay BA which now holds thereover, contacts BG2 having disconnected the local circuit for this relay via resistor BYD. Relay BOV in releasing will also have extended a local holding circuit via resistor BYE and contacts BB3 for the calling local link on the called side of its circuit.

The operator now dials the remainder of the number, comprising the single digit necessary to effect connection with the subscriber on the terminal exchange and the selecting switch BS, Fig. 9, is set accordingly, relay BC holding during the train in the usual manner. It will be noted that since relay BP is operated the normal testing circuit of relay BH is broken at contacts BP6 and instead a path is prepared for relay BVR on to wiper BS4. At the end of the impulse train, relay BC in releasing initiates the slow release of relay BE and during this time battery via resistor BYH, Fig. 10 is extended over contacts BE6 and BC3, the D wire and through the calling local link of Figs. 7 and 8 back to the D wire of the calling party's line circuit. From there it extends to bank BS4 of the incoming selector, the bank wiring of this switch being multipled to that of the local connectors. Hence if the number given by the calling party is actually his own number, relay BVR will operate from the battery potential placed on the D wire and in so doing will at contacts BVR1 return verification tone via common lead 24 to the operator. Relay BVR also locks up over its lower winding dependent upon relay BCN. If the calling subscriber has given the wrong number the battery potential will not be encountered and relay BVR will fail to energise so that on the release of relay BE, the operator will receive busy tone over common lead 19 which will indicate to her that the number given as the calling number by the calling party as his own is incorrect.

The verification release signal consists of the application of earth to both wires of the junction. Under this condition relay BPC operates but relay BNC fails to do so since it is now in the short-circuited lead. Accordingly the holding circuit of relay BOVR is broken at contacts BPC2 and it thereupon releases. When the unbalance is removed, relay BOG re-energises via contacts BPC2, BOVR2 and BP2 and at contacts BOG2 and BOG4 reconnects the junction to the calling subscriber via the original path through the local link of Figs. 7 and 8. The re-operation of relay BOG also releases relays BG and BC and the switch BS restores to normal. Relays BA and BB restore when relay BOG re-operates but relays BP, BRF and BOG remain energised throughout the conversation subsequently taking place and only restore when the local link is released on the calling party hanging up.

With regard to the private wire control facility whereby an operator may dial on to a subscriber's line to supervise or assist him in the making of a call so as to ensure that the subscriber can correctly perform the simple signalling operations necessary to effect the setting up of a call, the operator will effect connection with the subscriber by dialling in usual manner over an incoming selector and after instructing him in the procedure she will tell him to hang up and then to originate a call. At the same time she applies an earth unbalance signal to the incoming junction which brings up relay BPC, Fig. 10. This relay in turn releases relay BOVR, whereupon at contacts BOVR1, Fig. 9, the subscriber's line circuit is freed by the disconnection of the switching relay BH from the P normal lead. The operator now extends a battery unbalance signal over the junction and this signal brings up relays BPC and BNC, whereupon since relay BC is operated at this time, relay BCN is now operated. Relay BCN releases relay BC at the end of the signal and connects the operator to the subscriber's line via capacitors BQA and BQB so that the operator can listen in to the tones which the calling party will be receiving from the local link when he originates the call and can advise the subscriber if any errors are made.

Since all the rural exchanges on the network are completely unattended, it is furthermore desirable that the operator or a test clerk at the main exchange shall have facilities for testing that subscribers on all exchanges can gain access to the main exchange. For this purpose a "test call" unit will be provided in each rural exchange which will be accessible only over the banks of incoming selectors, connection thereto being effected in response to the dialling by the operator or test clerk of the digit 7 normally used by the subscribers to gain access to the main exchange. This "test call" unit functions on the lines of the well-known "faultsmen's ringback" circuit but modified to meet the requirements of the present type of circuit. The procedure will be for the operator or test clerk to dial digit 7 into the required rural exchange and so gain access to the "test call" unit thereat. The incoming connection will now be released and this unit is arranged so that it will thereupon automatically simulate the origination of a level 7 call so as to gain connection to the main exchange. When the main exchange answers, a suitable tone will be heard which will indicate that the selecting equipment at the rural exchange concerned is functioning correctly and then when the main exchange clears, all equipment will be released.

Referring now to the 42+7 link circuit of Figs. 11 and 12, this largely follows the 9+1 circuit of Figs. 7 and 8 described earlier. The maximum number of available lines including junction lines is forty-nine, and this may be split up into say forty-two subscribers' lines and seven main exchange junction lines, or alternatively there may be less subscribers' lines and more junction lines, or vice versa.

For ordinary subscribers' lines two-digit numbers in the series 11–60 are allocated so that two separate depressions of the signalling button will be required to set up a local call. Where a number of subscribers' lines form a P. B. X group, then in the case of small groups a two-digit number will be signalled to gain access to the first line in the group after which automatic hunting over the group is performed. In the case of a large P. B. X group, a single digit only may be necessary, these remarks also applying to the junction line group.

The forty-nine available lines are shown divided up as follows, but it will be appreciated that the discriminating banks CFS4 and CFS9 of the final selector CFS may be strapped differently to suit the particular arrangement desired.

| Type of Lines | Digits to be Signalled | Positions allocated on Final Selector Banks |
| --- | --- | --- |
| Seven Ordinary Lines | 11–17 | 3–9 |
| Four Ordinary Lines | 21–24 | 10–13 |
| Small P. B. X. Group (Three Lines) | 25–27 | 14–16 |
| Seven Ordinary Lines | 31–37 | 17–23 |
| Seven Ordinary Lines | 51–57 | 31–37 |
| Seven Ordinary Lines | 61–67 | 38–44 |
| Large P. B. X. Group (Seven Lines) | 4 | 24–30 |
| Junction Line Group (Seven Lines) | 7 | 45–50; 1 |

From this it will be seen that forty-two subscribers are normally arranged in six groups of seven subscribers, with "7" as the first digit used to call the operator. Hence a calling subscriber has never to count more than seven at any time and the maximum total count is thirteen.

It will also be seen that there are two main types of groups available from the first digit, those over which the link final selector switch is stepped under control of the subscriber's second digit, i. e. ordinary subscribers' lines, the small P. B. X group being a special example where the second digit serves to set the final selector switch to a position from which automatic hunting may take place, and those over which the switch tests automatically after the first digit movement, i. e. the junction group and the large P. B. X group. The contact in the bank CFS4 or CFS9 preceding the former type of group is wired to tag S and that preceding the latter to tag J. All other contacts encountered during the first digit complete an automatic drive circuit for the final selector switch via tags SG and P. B. X so that the final selector will move from group to group under control of the subscriber and will stop on the line preceding the first line of the desired group.

Considering now the detailed circuit operation, when the link is seized from the allotter by the extension of earth over lead 14, relay CSS, Fig. 11 is energised and thereupon provides a testing circuit for relay CFH and a driving circuit for the finder switch magnet CLFM, while it also brings up relays CA and CFD. Relay CA in operating causes rhythm relay CRR to swing its armature away from its contacts, while relay CFD in operating connects relay CTS to the time pulse "S" lead 16.

When the finder switch CLF reaches the calling line, relay CFH energises over its two windings in series and thereupon at contacts CFH2 provides a low resistance guard earth and at contacts CFH1 brings up relay CFR and opens the magnet driving circuit. Relay CFR in operating switches through the speaking conductors to relay CA, disconnects earth from the overflow common lead 13 and applies earth to lead 12 so as to step the allotter switch in the common equipment on to another free local link. It also releases relay CSS, and completes a holding circuit for relay CFD via contacts CFD6, CER6, CDI and CFR6 to earth.

When the subscriber operates his signalling button to initiate the first digit, relay CA releases, whereupon relay CRR is allowed to swing back and make its contacts CRR1, thus operating relay CPU. Relay CPU in operating, at contacts CPU2, Fig. 12, energises the connector switch magnet CFSM, at contacts CPU4 gives a small energisation to relay CRR to maintain its swinging action and at contacts CPU1 extends number unobtainable tone over common lead 18 and the windings of relay CA back to the calling party. When relay CRR opens its contacts, relay CPU releases and de-energises the connector switch magnet and at the same time opens the tone circuit. In releasing it also de-energises relay CRR which thereupon swings back to reclose its contacts and the cycle of operations thereupon repeats itself, the calling subscriber receiving a tone pulse for each operation of relay CPU.

It will first be assumed that access is required to the line whose number is 11. In this case when magnet CFSM is first energised and the calling party hears the first pulse of tone, he will restore his push button to re-operate relay CA. On the release of relay CPU, magnet CFSM in releasing advances the wipers to position 2, whereupon earth extends over wiper and bank CFS4, tag S and contacts CHS5, CFD3, CHS4 and CA2 to bring up relay CE in series with resistor CYG. Relay CE in operating locks via its contacts CE1. No further operations take place until the calling subscriber re-depresses the signalling button to release relay CA, whereupon at contacts CA1 relay CRR is released and relay CPU is re-operated and the stepping operation recommences.

When wiper CFS4 reaches position 3 corresponding to the first line of the group, earth is extended over tag SG and contacts CE5 to bring up relay CER which at contacts CER3 prepares a circuit for short-circuiting relay CE, and at contacts CER6 disconnects relay CFD and completes a local locking circuit for itself.

Since the required line has now been reached, the signalling button will have been released thereby re-operating relay CA which at contacts CA1 stops the stepping movement and completes a testing circuit for relay CH, while at contacts CA2 relay CE is short-circuited via contacts CHS4 and CER3.

If the required line is free, relay CH switches during the release time of relay CE and when it falls away, ringing of the called party's bell proceeds in the usual manner via the winding of relay CF, ringing tone being returned to the calling party via lead 20 and contacts CH2, Fig. 11. If the required line is busy, relay CH will fail to operate and busy tone will be returned to the calling party via common lead 19.

Similar remarks apply in regard to the signalling of lines 12—17.

Assuming now that line 21 is required, the signalling button will be released when the second tone pulse is received, i. e. at the time the final selector is to advance from position 2 to position 3. Hence when it reaches position 3 the interacting circuit between relay CPU and magnet CFSM will be broken at contacts CA1, but a self-driving circuit is now completed for magnet CFSM via tag SG and contacts CE5, CPU5, CH6 and CFSMC so that the wipers will be rapidly advanced to position 9 where the self-driving circuit is opened. It will be noticed that this position connects with tag S and immediately precedes the second group of ordinary subscribers' lines, i. e. the group of lines 21—24. On the re-depression of the signalling button the stepping operation recommences, the required one of the lines 21—24 being selected in the manner already described.

If the small P. B. X group 25—27 is required, the second release of the signalling button will occur after five tone pulses have been received so that the wipers of the final selector will be halted in position 14 over which wiper CFS4 connects with tag P. B. X. Since relay CE is operated at this time, a circuit is completed for relay CHS which in operating, at contacts CHS1 and CHS3 maintains the interacting circuit between relays CPU and CRR in spite of the re-operation of relay CA so that the switch CFS continues to advance automatically step-by-step. No further tone pulses are returned to the calling party however owing to the disconnection of the tone circuit at contacts CHS2 and relay CHS also locks via contacts CHS4, CA2, CE1 and CFR6 to earth. During the P. B. X hunting operation relays CA, CE and CER are all operated and thus establish a testing circuit for relay CH so that if any of the lines are free, relay CH will operate and open the driving circuit at contacts CH3 and at contacts CH5 will short-circuit relay CE which commences to release slowly. On the release of relay CE, contacts CE7, Fig. 12, and CE6, Fig. 11, connect up the usual ringing and ring tone circuits. If all lines in the group are engaged, when the last line is reached earth will be extended over wiper CFS4 and tag S (since a two-digit P. B. X group is always located at the end of a main group) to short-circuit relay CE. Relay CE in releasing at contacts CE1 opens the holding circuit of relay CHS and the release of the latter thereupon at contacts CHS1 stops the switch movement and at contacts CHS2 supplies busy tone over common lead 19 to the calling subscriber.

If individual lines 26 or 27 of the P. B. X group are signalled, the operations proceed as if these lines are ordinary lines so that no P. B. X hunting action will be initiated.

As regards the signalling of any one of the ordinary lines 31—37, 51—57 or 61—67, the operations concerned are similar to those involved in the signalling of the ordinary lines 21—24, the final selector moving from group to group under control of the subscriber. Thus in response to a first digit 3 the switch wipers will be set to position 16, in response to a first digit 5 they will be set to position 30 and in response to a first digit 6 they will be set to position 37. It may be mentioned in connection with the signalling of the first digits 5 and 6 that after the fourth tone pulse has been received, i. e. when the final selector is self-driving over contacts 17 onwards, when contact 23 is reached earth will be extended over wiper CFS4 and tag J to bring up relay CHS. Relay CHS does not lock in this instance, however, since the signalling button has not been released to re-operate relay CA, but at contacts CHS2 (Fig. 11) it disconnects the tone circuit. The final selector stops on position 23 until relay CPU again energises in usual manner to initiate the next energisation of the magnet CFSM. When it does so, contacts CPU3 open the circuit of relay CHS which recompletes the tone circuit and so allows the fifth tone pulse to be sent out to the calling party, while magnet CFSM is again energised. On the release of relay CPU, the switch wipers are advanced to position 24 whereupon a self-interrupted driving operation again takes place to advance them to position 30, in which position they remain if the push button has been released in response to the transmission of the fifth tone pulse. Alternatively they are stepped on to position 31 and self-drive to position 37 if the push button is only released in response to the sixth tone pulse.

Considering now the signalling of the large P. B. X group for which a single digit 4 is allocated, when the final selector wipers reach position 23 which connects with tag J, relay CA will be already re-operated in response to the restoration of the signalling button, and hence when relay CHS is operated via tag J it will bring up relay CE and both relays will thereupon lock over contacts CE1 and the switch stepping operation will be resumed. Hunting for a free line in the P. B. X group will thereupon take place in the same manner as for the small P. B. X group already described, the switch wipers on being stepped on to the first line of the group completing a circuit via tag SG for relay CER in usual manner. If all lines in the group are engaged, when the last line (position 30) is reached, the switch motion is halted by the short-circuiting of relay CE via tag S and relay CHS is released to return busy tone to the calling party.

In the case of the junction line group for which digit 7 is allocated, when the final selector reaches position 44 relays CHS and CE are operated via tag J in the same manner as described for the large P. B. X group. When the final selector is caused to step on to the first line of the group, relay CER will be operated via tag JG, testing over each line of the group thereupon taking place. If all junction lines are busy, when the last line (position 1) is reached, the released condition of relay CH will allow the switch to step on to position 2 where relay CE is shunted down via tag S and halts the switch motion and at the same time releases relay CHS to return busy tone to the calling party. This position 2 is left unwired on other banks so that relay CH cannot possibly operate, the non-allocation of this position being necessary for metering discrimination purposes as will be described.

In each of the above instances if a free line is encountered, the called subscriber in answering will bring up the ring trip relay CF and this relay thereupon completes a circuit for relay CD. Relay CD at contacts CD1 opens the circuit of relay CER, which proceeds to release slowly, and at contacts CD2 completes a through circuit between the final selector wiper CFS3 or CFS8 and the line finder wiper CLF3 for a purpose to be described later in connection with the incoming selector of Figs. 13-15. On the release of relay CER, contacts CER4 extend earth back via wiper and bank CLF4 to the meter lead M, the earth being derived over contacts CH6 and CPU5 from wiper CFS4 or CFS9 via tag S, J, SG or P. B. X, the tag concerned being dependent upon the character of the selected line. It will be noted that for junction lines, where none of the tags S, J, SG or P. B. X are concerned, no metering circuit is completed, any necessary charging on these calls being recorded by the main exchange operator.

Considering now the various possible release conditions for the circuit, if the calling subscriber either hangs up or fails to signal after the maximum of seven effective first digit tone pulses have been transmitted, when the final selector reaches position 45 earth will be extended via tag JG and normal contacts CF1, CER8 and CE2 to bring in relay CTZ. Relay CTZ in operating at contacts CTZ3 disconnects relay CFH which in turn drops relay CFR and so breaks down the connection on the calling side of the circuit, while contacts CTZ2 and CTZ4 guard the circuit against seizure. Contacts CTZ1 complete a self-interrupted driving circuit for the magnet CFSM from the earth derived via tag JG, whereupon the final selector rapidly rotates its wipers through to the home position 1 where the homing circuit is opened.

In case the calling subscriber either releases the calling connection during the sending of the second digit or fails to signal the second digit until after the maximum of seven tone pulses has been transmitted, when relay CPU re-operates to step the final selector past the last line of the group which connects either with tag S or J, relay CTZ is brought up via tag S or J and contacts CPU5. This relay breaks down the connection as described and the final selector proceeds to advance through to the home position during which time the circuit remains guarded by the continued operation of relay CTZ. Contacts CTZ1 serve to maintain relay CTZ operated until the switch wipers reach position 45 after which it is maintained via tag JG until the home position is reached.

If the calling subscriber hangs up after signalling the second digit and either before or after the called subscriber has replied, relay CTZ is operated from earth via contacts CA1, CFR4, CFD5 and CE2.

If the called subscriber hangs up after answering, relay CTZ is operated over a circuit from earth via contacts CFR6, CD1, CER6, CFD6 and CE2.

Under time pulse release conditions, that is to say if the calling party fails to signal at all or fails to hang up after getting no reply, relay CTS operates from the "S" pulse over lead 16 via either contacts CFD1 or CER1. After a period of the order of 30 seconds the "Z" pulse over lead 17 brings in relay CTZ to clear down the circuit as above described.

Reference should now be had to the tandem exchange incoming selector circuit of Figs. 13-15, this selector functioning on the same general lines as the 10-line selector of Figs. 9 and 10 but with additional possibilities owing to the need for connection with remote exchanges.

There are three main types of calls to consider on this selector:

(a) Calls from the parent main exchange outgoing to a subscriber or a junction line accessible from the banks of the selector, the selector being responsive to a two-digit number in the case of subscribers' lines and to a single digit in the case of junction lines.

(b) Calls originating at the local tandem exchange.

(c) Calls originating at remote exchanges.

To simplify the description it will be assumed at this stage that the tandem exchange concerned connects directly with the main exchange, and is for instance, exchange RE, Fig. 2. On an incoming call from the main exchange, the loop extended forward from the operator over the junction conductors 80 and 81, Fig. 13, brings up relay DA in series with the differential relay DPC, which is non-operative at this time, and this is followed by relay DB, Fig. 14, which in turn brings up relays DC, Fig. 14 and DOVR, Fig. 13, the latter then operating relay DG, Fig. 14. Relay DC at contacts DC4 prepares an impulsing circuit for the vertical magnet DVM, while relay DG at contacts DG2, Fig. 13, busies the incoming selector against access via the tandem exchange.

As a result of the tandem exchange numbering scheme as previously mentioned levels 1-6 of the selector will be allocated to local subscribers. Hence if one of the digits 1-6 is dialled, relay DA in responding will transmit impulses at its contacts DA1 to the vertical magnet DVM via the low resistance lower winding of relay DC so as to raise the selector wipers to the corresponding level. During the train of impulses relay DB is intermittently short-circuited and is held operated, the battery feed to this relay via resistor DYJ being extended via rectifier DMRA to minimise any shunting effect on the magnet DVM. On the first vertical step of the switch, the off-normal spring set DN is operated and at contacts DN1 short-circuits the upper winding of relay DC to enable it to hold operated during the train. At the end of the train, relay DC releases slowly and on its release contacts DC1, Fig. 13, extend earth via the vertical wiper DAW in any of the positions 1-6 on the vertical bank DAB to bring up relay DE. Relay DE in operating, at contacts DE3, Fig. 14, removes the short-circuit from the upper winding of relay DC thus causing it to re-operate and so now to complete an impulsing circuit to the selector rotary magnet DRM via operated contacts DC4 and DE2.

When the second digit is dialled, the wipers are stepped over the selected level, relay DB holding operated as before. On the first rotary step the rotary off-normal spring set DNR is mechanically operated and at contacts DNR2 again short-circuits the upper winding of relay DC. At the end of the train relay DC releases slowly as before and when it releases it opens the holding circuit of relay DE at contacts DC1 and this relay proceeds to release slowly in turn. During the release time of relay DE a testing circuit is completed for relay DH, Fig. 15, from earth via contacts DC2, windings of relay DH and contacts DSC3, DAR3 and DB6 to the P wiper.

If the called line is free, relay DH operates and at contacts DH3 and DH6, Fig. 15, switches the incoming junction line via capacitors DQA and DQB through to the called subscriber's line, the operator receiving no tone in this instance. The operator may now ring the wanted party by extending a battery unbalance signal forward over the junction line and in response thereto relay DA remains held and relay DPC is operated. Thereupon at contacts DPC2 it brings up relay DNC, Fig. 14, which at contacts DNC1, Fig. 15, brings up relay DRR, whereupon at contacts DRR1 and DRR2 continuous ringing current via common lead 22 and resistor DYO is applied to the called line. After a short application of ringing, the unbalance signal is removed and hence when the wanted subscriber lifts off his receiver, he may converse with the operator via the incoming selector circuit which remains guarded against local access from the tandem exchange so long as the operator maintains the connection. On the reply of the called party relay DD, Fig. 15, operates and at contacts DD1 and DD2 it reverses the battery potential applied via relay DA to the junction line so as to give supervision to the operator.

If the wanted party is busy, relay DH will fail to operate during the release lag of relay DE, and hence when the latter releases and in so doing re-operates relay DC by removing the short-circuit from its upper winding at contacts DE3, busy tone will be returned to the operator via common lead 19, contacts DHS5, DH4, DVR1, DC6, DNR3, DE6 and DAR5 and the windings of relay DA.

The operator may now offer the call to the engaged party by extending a battery unbalance signal which operates relay DPC which in turn brings up relay DNC. This time, since relay DH is normal, earth will be extended via contacts DOVR4, DNC1, DD3, DH2 and DC5, to bring up relay DCN. Relay DCN locks over its upper winding and at contacts DCN2 holds relay DC so long as the unbalance signal remains applied. At contacts DCN3 and DCN4, Fig. 15, it connects the junction line via capacitors DQA and DQB through to the required line. The parties in conversation are now advised by the operator to hang up their receivers and the unbalance signal is removed from the junction, whereupon relays DPC and DNC restore, while relay DC also restores, but relay DCN remains held. A re-application of the unbalance signal now completes a breakdown circuit, relay DNC in re-operating at contacts DNC1 applying a full earth via the P wiper and bank to shunt down any switching relays already switched into this point. When the unbalance is removed, relay DH operates over its windings in series in the usual manner and a subsequent application of the unbalance signal brings in relay DRR to apply ringing current to the called subscriber as previously described.

When at the end of conversation the operator clears by withdrawing her calling plug, a momentary earth unbalance is automatically applied to the line and hence relay DPC operates but not relay DNC. Hence at contacts DPC1 relay DOVR is released and on the removal of the unbalance, relays DA, DB, DG, DCN and DH release in turn. A self-driving circuit is then completed for magnet DRM over contacts DH8, DHR1, DGP1, DN2, DE4, DRMC, DAR1, DOG7, and DG7 to earth via delayed alarm equipment connected to lead 82 clear of the banks, after which they fall and rotate under the banks by spring tension back to their normal position where the off-normal contacts DN2 open and disconnect the release circuit.

Where the required line forms part of a P. B. X group, P. B. X hunting facilities can be provided on the selector and for this purpose the first line in the group is connected to battery potential in the H bank and the last line is connected to earth. Hence if the first line of a P. B. X group is dialled, relay DHS will be operated over its lower winding via the H wiper and bank on the release of relay DC. If the first line of the group is busy when relay DE, Fig. 13, releases and permits the re-operation of relay DC, earth from contacts DC2 is extended via the upper low resistance winding of relay DHS and contacts DHS2 to re-energise the rotary magnet DRM, Fig. 14. At the same time the shunt provided over contacts DC2 to the lower winding of relay DGP is removed and this relay is thus connected in series with the windings of relay DH. On the energisation of the magnet DRM, the switch wipers are stepped to the next position and thereupon if this line is free, relay DH will operate and at contacts DH8, Fig. 14, will disconnect the rotary magnet circuit and will otherwise function in normal manner. If this line is busy, magnet DRM in operating its interrupter contacts DRMC, Fig. 14, will complete an energising circuit for relay DGP over its upper winding in series with the upper winding of relay DHS and relay DGP at contacts DGP1 will open the rotary magnet circuit, whereupon on the release of the magnet the operating circuit for relay DGP over its upper winding is opened, and on the release of this relay the magnet circuit is re-completed, and the wipers are advanced to the next position. Interaction between relay DGP and magnet DRM continues until either a free line is reached or alternatively the last line of the group is reached. In this latter event relay DH will fail to operate as usual, but relay DGP will now hold over its upper winding via resistor DYN from earth picked up by the H wiper, and so will prevent further energisation of the magnet DRM. Relay DHS, which will have been holding operated between impulses during the P. B. X hunting operation due to its slug, now releases, and at contacts DHS2 further opens the magnet driving circuit, while at contacts DHS3 it opens the circuit of relay DGP and at contacts DHS1 it opens the testing circuit for relay DH. At contacts DHS5 busy tone is now returned from common lead 19 to the operator.

If an outgoing junction digit 8 or 9 is dialled to connect with a subscriber on one of the more remote exchanges, it will be seen that since levels 8 and 9 of the vertical bank DAB, Fig. 13, connect on the left-hand side also to relay DAR, this relay will be operated at the end of the vertical movement over contacts DC1 when relay DC falls away, relay DJA being normal. Relay DAR locks up over its contacts DAR4, opens the circuit of relay DC at contacts DAR6, Fig. 14, at contacts DAR1 completes a self-interrupted driving circuit for the rotary magnet DRM and at contacts DAR3 connects test relay DHJ, Fig. 15, to the P wiper in place of relay DH. Hunting for a free junction to the required exchange or to the next tandem exchange en route to the required terminal exchange now takes place, all unallocated outlets in the level being earthed on the P bank.

If a free outlet is reached relay DHJ, Fig. 15, rapidly operates to stop rotation by opening contacts DHJ1, Fig. 14, and at contacts DHJ2 brings up relay DHR. This relay in operating locks over contacts DHR4 and further disconnects the magnet DRM circuit at contacts DHR7, while at contacts DHR1, DHR2 and DHR3, Fig. 15, DHR5, Fig. 13, and DHR6, Fig. 14, it switches through the ST, negative, positive, H and SW leads to the tandem repeater circuit of Figs. 16-18, which now performs the holding of the call as will be seen later. Relays DA and DB release on the operation of relay DHR, but relay DOVR, Fig. 13, remains held via contacts DG3, DOVR2 and DHR5 and the H wiper and bank to an earth potential which will be encountered in the tandem repeater circuit and thus maintains relays DG and DAR. Under these conditions it will be seen that the selector acts as a straightforward group selector, the junction conductors 80 and 81 being switched straight through without any transmission bridges to the tandem repeater circuit.

If no free junction in the selected level can be found, the wipers will rotate to the 11th step position where the 11th step spring set DS is mechanically operated and relay DHJ, Fig. 15, operates in series with resistor DYQ connected to the 11th step bank contacts and operates relay DHR. Relay DA now remains held via the 11th step positions of the negative and positive banks while 11th step contacts DS1, Fig. 14, return busy tone via contacts DAR5 and common lead 19.

On an outgoing call from the tandem exchange RE, when a local subscriber signals the number 7 corresponding to outgoing main exchange junctions, the switching relay CH, Fig. 12, in the local link circuit will switch in over the P lead of the set of leads entering at the foot of Fig. 13 to relay DP in parallel with resistor DYE. Relay DP in operating brings up relays DOG and DRF, the latter being slow to operate by virtue of the series resistor DYD and shunt capacitor DQC. During its energising time a ringing pulse is extended forward from common lead 22 over the junction leads 80 and 81 to seize the equipment at the main exchange end of the junction. Ringing from the local link will have been tripped by battery connected through resistor DYB, Fig. 13, to the incoming negative lead. When the operator inserts her answering plug into the jack of the calling junction, she will ascertain the number of the required party and also of the calling party for verification purposes.

To effect verification, the operator will wish to dial back on to the incoming selector. To do this she either inserts her calling plug into the multiple jack of the calling junction or alternatively throws a verification key. In either event the circuit conditions at the main exchange are such that a momentary battery unbalance is extended over the junction and through the incoming selector via contacts DOG2 and DOG3 and DRF2 and DRF4, Fig. 13, into the calling local link. Relay CPC, Fig. 12, is thereupon energised and extends a battery potential forward over wiper and bank CFS3 and the D wire to bring up relay DSC, Fig. 13. Relay DSC in operating brings up relay DOV which in turn operates DOVR and also completes a local operating circuit for relay DA, Fig. 14, via resistor DYG, whereupon relay DB also operates followed by relay DC. Relay DOVR in operating, at contacts DOVR2 disconnects the original operating circuit for relay DOG but this relay remains held via contacts DOV2 until the unbalance signal is removed. When the signal terminates, relay CPC, Fig. 12, releases and drops relays DOV and DOG in turn, relays DSC and DOVR remaining held over local locking circuits. Relay DOG on returning to normal now operates relay DG, Fig. 14, and also reconnects the junction line 80, 81, to relay DA which now holds thereover, the operation of relay DG having disconnected the local operating circuit for relay DA at contacts DG6. The release of relay DOV also provides a local holding circuit via resistor DYA and contacts DOV4, Fig. 13, for the local link on the called side of this circuit.

The operator now dials the remainder of the number comprising the two digits necessary to effect connection with the subscriber on the tandem exchange, and the incoming selector is set accordingly, relay DC holding operated throughout each train in usual manner. It will be noted that since relay DSC is operated, the normal testing circuit of relay DH is broken at contacts DSC3, Fig. 15, and instead a circuit is prepared for relay DVR over wiper RN. At the end of the second impulse train, relay DC in releasing initiates the slow release of relay DE, and during this time battery via resistor DYK, Fig. 14, is extended via contacts DE1, DC7 and DOG6 over the D wire and through the calling local link of Figs. 11 and 12 back to the D wire of the calling party's line circuit. Thence it extends to bank RN, Fig. 15, of the incoming selector, local levels of banks —, +, P and RN in the multiple ISM of this selector connecting respectively with banks —, +, P and D of the local link line finder multiple LFM. Hence, if the number given by the calling party is correct, the battery potential placed on the D wire will extend over contacts DSC4, DAR2, lower winding of relay DVR and contacts DC2 to earth. Relay DVR is therefore operated and locks up over its upper winding and at contacts DVR1 returns a verification tone via common lead 24 to the operator, this being effective on the release of relay DE and the resulting re-operation of relay DC. If the number is incorrect, relay DVR will fail to operate so that the operator will receive busy tone via common lead 19.

It will be noted that this process functions equally well in the case of a P. B. X group. The usual automatic movement takes place and relay DGP this time tests in circuit with relay DVR over wiper RN until the marked calling line is reached. Relay DGP is then held to stop rotation and relay DVR operates as before to return verification tone. If the wrong number has been given the selector will rotate to the end of the group and will return busy tone.

The verification release signal, which is initiated either in response to the removal of the calling plug from the calling junction multiple jack or in response to the restoration of the verification key, consists in the momentary application of earth to both wires of the junction. Under this condition relay DPC, Fig. 15, again operates, but relay DNC, Fig. 14, fails to do so since it is now in the short-circuited lead. Accordingly the holding circuit of relay DOVR is broken at contacts DPC1, Fig. 13, and it thereupon releases. When the unbalance is removed, relay DOG re-energises via contacts DP5, DOVR2, DHR5 and DPC1 and reconnects the junction 80 and 81 to the calling subscriber via the original path through the local link of Figs. 11 and 12. Relays DG, DA, DB and DC now release and initiate the restoration of the switch wipers to normal.

Should the subscriber required by the calling party be on a remote exchange using this exchange as a tandem, the back dialling conditions obtain as before. The operator after making and releasing the verification call to the calling party will insert her calling plug in the calling junction multiple jack and a momentary battery unbalance signal will then be sent to bring up relays DOV, DOVR, DA, DB and DC. When the signal terminates, relays DOV and DOG are released as before, whereupon relay DG operates and the junction line is reconnected to relay DA, the calling local link being held in the usual manner at this time. The operator now dials the requisite number on to the incoming selector to gain access to a junction extending to or towards the required remote exchange.

Assuming that remote exchange RB, Fig. 2, is the required exchange, the digit 8 will be dialled on to the incoming selector at exchange RE to gain access to exchange RD. As before described the incoming selector steps to level 8, whereupon on the release of relay DC, relay DAR is brought up and initiates an automatic rotary hunting operation over the selected level. When an idle junction is found, relay DHJ, Fig. 15, operates over the P wiper and bank from idle marking battery by way of a resistor such as Fig. 18 in the tandem repeater associated with the idle junction to the required exchange. Relay DHJ in operating brings up relay DHR which switches the leads through to the tandem repeater which, as will be later described, performs the holding of the call. Relays DA and DB release on the operation of relay DHR, while relays DHR and DOVR are held from earth potentials returned from the tandem repeater circuit via the P and H banks and wipers and relay DOVR holds relays DG and DAR.

In response to the dialling of a further digit 9 necessary to gain access from exchange RD to the required exchange RB, and in response to the dialling of the final digit necessary to connect with the required subscriber on exchange RB, impulses will be transmitted to the tandem repeater of Figs. 16–18 which repeats them out over the junction to exchange RD where digit 9 is effective to set the incoming selector thereat to level 9 which gives access to the terminating exchange RB. The final digit is repeated by the tandem repeater at exchange RD associated with the junction from exchange RD to exchange RB and serves to set up the 10-line incoming selector at the terminating exchange RB to effect connection with the required party.

When the called subscriber answers after being rung by the operator, a battery reversal is effected over the junction line from the tandem repeater at exchange RD through to that at exchange RE. The repeater at exchange RE thereupon repeats the reversal through to the operator and also prepares to extend an earth potential over start lead ST extending to the ST wiper and bank, Fig. 15. The operator on receiving the battery reversal proceeds to connect up the calling and called subscribers by the shortest path, i. e. via the tandem exchange RE, by extending a battery unbalance signal forward over the junction line 80 and 81. This signal extends forward into the tandem repeater of Figs. 16–18, which thereupon as will subsequently be described connects earth to the ST lead whence it is extended via the ST bank and wiper, Fig. 15, contacts DHR1, windings of relay DCR and contacts DP6 to battery via resistor DYP. Relay DCR operates over this circuit and locks up at contacts DCR1 and DCR5 and at contacts DCR2 applies earth over the RN wiper and bank to bring up a relay ERN, Fig. 18, in the repeater which thereupon causes the associated hunter switch to rotate. Relay DCR also at contacts DCR3, Fig. 14, applies battery potential via resistor DYL and parallel-connected relay DRS and contacts DOG6, Fig. 13, to the D wire and through the calling local link to mark the calling line. The tandem repeater hunter switch on reaching this marking will stop and will thus complete a circuit between the called and calling subscribers. Relay DRS, Fig. 14, operates in series with the 11 ohm upper winding of the testing relay EK, Fig. 18, in the tandem hunter circuit, the SW bank of the tandem hunter giving access to the D leads of the various subscribers on the local tandem exchange RE. Relay DRS at contacts DRS1, Fig. 15, releases relay DHR, at contacts DRS3 opens a point in the locking circuit for relay DCR, and at contacts DRS2, Fig. 14, brings up relay DCN, so that the operator is reconnected to relays DPC and DA and is coupled to the subscribers' conversational circuit via capacitors DQA and DQB. Relays DA and DB re-operate thus providing locking circuits for relays DCN and DG, while relay DOVR holds over contacts DPC1 on the release of relay DHR. At the instant of switching by the tandem hunter, the low resistance earth extended forward via the 8-ohm lower winding of relay EK, Fig. 18, wiper and bank ETH5 or ETH10 and the H bank which is wired out to the P normal leads of local subscribers' line circuits will hold the cut-off relay in the calling party's line circuit, and at the same time forcibly releases the local link originally taken into use by this subscriber, whereupon relays DP, DRF and DSC, Fig. 13, DCR, Fig. 15, and DRS, Fig. 14, are released.

The operator remains tapped into the tandem repeater via the capacitors DQA and DQB until it is confirmed that conversation has commenced when she will withdraw her answering and calling plugs, thus releasing the junction line 80, 81 to exchange RE, and accordingly releasing relays DA, DB and DCN. A momentary earth unbalance is automatically applied to the junction line on the withdrawal of the calling plug and this serves to bring up relay DPC which at contacts DPC1 releases relay DOVR, Fig. 13, and this in turn releases relays DG and DAR, whereupon a self-interrupted driving circuit is completed for the selector rotary magnet DRM and the switch is restored to normal.

A call originated by a remote exchange subscriber for a subscriber connected to the tandem exchange or another remote exchange connected thereto follows largely on the lines detailed above. From reference to Fig. 3 it will be seen that if the calling remote exchange is RD, then when a junction is seized to exchange RE, assumed to be the tandem exchange in which the switch of Figs. 13–16 is located, the tandem repeater TR1 associated with the junction concerned causes its hunter switch TH1 to hunt for an incoming selector which is not already in use either from the tandem exchange or from the main exchange junction. Access to the incoming selector is had over the tandem hunter multiple THM, Fig. 13, and if the incoming selector is not already in use, the switching relay associated with the tandem hunter will switch in to relay DP which operates and brings up relays DOG and DRF, whereupon the main exchange is rung as described above in connection with a call from a local tandem exchange subscriber. In this case, however, since there is assigned to each incoming junction group a minor type relay such as DJA, Fig. 13, this relay DJA will in the present instance be operated over the H lead and serves to indicate the particular junction group calling.

Revertive dialling from the operator and subsequent elimination of the junction to the operator is effected as described above, except that when the operator throws her key the calling tandem repeater hunter switch will rotate to find the selected junction or subscriber instead of the calling subscriber as in the previous case. If a local tandem exchange subscriber is being called the operating circuit for relay DCR is shown within the selector and is by way of contacts DOVR4, Fig. 15, DNC1 and DD3, windings of relay DCR in series and contacts DP6 to battery via resistor DYP, relay DD having been operated when the called party replied and relay DNC operating from the battery unbalance when the operator throws the key. The start condition to the tandem hunter is provided via contacts DCR4, Fig. 13, and lead SW on to the corresponding bank of the tandem repeater hunter switch, while the battery marking for the hunter switch is provided via resistor DYL and relay DRS, Fig. 14, and contacts DCR3, DSC6 and DH9 and the SW wiper and bank.

If the junction dialled is in the same group as that of the originated call, as it will be if the call is from exchange RD to exchange RB, when the vertical wiper DAW, Fig. 13, reaches that level, relay DJA associated therewith will be already operated. Hence instead of relay DAR being operated as previously described to initiate automatic rotary movement, relay DOG is re-operated to switch the call back over the incoming junction. This relay also at contacts DOG1 places a battery potential via resistor DYF and contacts DOVR1, DN3, DOG1 and DJA3 on to the H bank of the tandem hunter and a signal is thus transmitted over the tandem hunter H wiper to indicate to the tandem repeater that an outgoing call is about to proceed and this in turn extends an earth unbalance signal to the distant exchange to connect up the incoming selector thereat.

Considering now the tandem repeater circuit of Figs. 16-18, as the number of access arrangements on this unit shows, the circuit functions in several ways, and it is necessary to visualise its position in the trunking layout fairly clearly especially in regard to the incoming selector of Figs. 13-15.

The junction 90, 91 on the left in Fig. 16 is connected to an exchange which may be either a terminal exchange or another tandem exchange but in either case is more remote from the parent exchange. The tandem hunter uniselector on the right in Fig. 18 gives access via multiple THM to:

(1) The junctions towards the main exchange which may be direct or via another tandem and to each of which is tied an incoming selector.

(2) The local tandem repeaters serving other remote exchanges associated with this tandem exchange.

(3) The subscribers on the local tandem exchange.

The access via multiple ISM, Fig. 18 is from the level of the incoming selector corresponding to this particular group of junctions while the incoming multiple THM, Fig. 17, connects with the banks of local tandem hunters associated with other exchanges dependent on this tandem. The different types of call can be considered individually together with the appropriate variations.

Assuming again that the local tandem exchange concerned is RE and considering first a call incoming from a remote exchange such as RD or RB via junction 90, 91, the ringing pulse from the remote exchange operates relay ERL which energises relay EIR, Fig. 17. This relay at contacts EIR4, Fig. 16, completes a self-interrupted driving circuit for the hunter uniselector magnet ETHM via the busy common 92 which will be earthed so long as there is an available junction to the parent exchange, and at contacts EIR1, Fig. 18, completes a testing circuit for relay EK over its upper winding and wiper and bank ETH4 or ETH9 on to the P lead. The junctions towards the main exchange are the only outlets to which battery is normally connected in the P bank, each such battery being connected by way of a relay DP, Fig. 13, and parallel resistor DYE in the incoming selector. Hence when a free junction is reached, relay EK operates to stop the switch movement at contacts EK1, Fig. 16, and to energise relay EKR in series with the magnet ETHM which is non-operative in this condition. In the incoming selector, relay DP, Fig. 13 in operating brings up relay DOG and also operates the slow relay DRF to transmit a ringing pulse out over the junction conductors 80, 81, either to the main exchange as in this instance, or to the next tandem exchange between this tandem exchange and the main exchange in which case the operations just described then take place in the tandem repeater thereat. Relay EKR, Fig. 16, in operating switches the incoming junction leads 90, 91 through via the tandem hunter and the incoming selector to the "outgoing to main" junction leads 80, 81, Fig. 13, while at the same time an operating circuit is completed over the H wiper and bank for relay DJA, Fig. 13 in series with relay EOG, Fig. 17, which is non-operative in this condition.

Relay ERL is maintained as long as the ringing is applied from the calling remote exchange, and when this ceases, it restores and operates relay EIC via contacts EIR3 of relay EIR which is now releasing slowly. The calling junction 90, 91 is now connected through to the rectifier-polarised relay ED, the direction of current from the remote exchange being such as to operate this relay since the speaking leads of the junction are reversed in the bank of the switches such as AFS, Fig. 8, or CFS, Fig. 12. Relay ED brings up relay EDR which in operating holds both relays EIC and EIR, and at contacts EDR2 and EDR4, Fig. 17, reverses the potential forward to provide holding conditions for the next stage, if any.

At this point several possible variations occur as the call may be for a subscriber (a) Obtained via the parent exchange.

(b) Obtained via a tandem exchange between this exchange and the parent exchange.

(c) On the exchange at which the repeater is located.

(d) On another remote exchange directly connected to this tandem exchange.

(e) Obtained via a tandem exchange connected to this exchange and located on the remote side from the parent exchange and in the calling path.

In no circumstances can the call be for a subscriber on the originating exchange, since this would have been automatically completed by the subscriber on the local link thereat.

In the case of either (a) or (b), connection between the calling and called parties is effected by the operator in the manner already described without producing appreciable changes in the equipment of Figs. 13–18. Relays EA, Fig. 17, and EB, Fig. 16 energise when the loop is switched through to the circuit ahead and the operator only remains in the connection if the call is routed via the parent exchange. Release in either of the above two cases is obtained through the calling subscriber restoring in response to which relays ED and EDR, Fig. 16, EIR and EIC, Fig. 17, EK, Fig. 18, and EKR, Fig. 16, in the tandem repeater release in that order, relays DP, DOG, DRF and DJA, Fig. 13 also releasing in the incoming selector as a result of the removal of earth from the P lead on the release of relays EIR and EIC.

In case (a), if the operator withdraws her answering plug, or in case (b), if the distant subscriber restores, relay EA, Fig. 17, is released, thus operating relays EC and ECA, Fig. 16. When relay EB drops away, the circuit of relay EIC is broken and this releases relays EIR, EK, and EKR as before. The opening of the original incoming loop at contacts EIC5 releases relays ED and EDR and initiates release at the calling remote exchange and removal of earth from the P lead of the tandem hunter releases the operated relays in the incoming selector.

When considering case (c), i. e. a call from a remote exchange to a subscriber on this local tandem exchange, it will be assumed that the parent exchange has been reached via another tandem exchange, i. e. assume that exchange RB is calling exchange RD. When the operator inserts her calling plug into the calling junction multiple jack, a momentary battery unbalance is automatically transmitted into the tandem repeater at the nearest calling tandem exchange RE, this unbalance serving to energise relays similar to EPC, Fig. 17, and EPR, Fig. 16, relay ENC being short-circuited at this time by contacts EOG5. Relay EPR in operating applies battery via resistor EYG, Fig. 18, to the H wire via wiper and bank ETH5 or ETH10 and so momentarily brings up a relay similar to relay DOV and hence also relay DOVR, Fig. 13. On the termination of the unbalance signal, relays EPC, EPR, DOV and DOG release, while relay DOVR together with relay DG, which will have operated on the release of relay DOG, now remain operated, relay DOVR being held over a circuit including operated contacts DG3 and DOVR2 and resting contacts DHR5 and DPC1 to earth. Relay DOG in restoring reconnects the junction line from the operator to the incoming selector in exchange RE.

The first digit dialled by the operator into the incoming selector in exchange RE will be the digit 8 corresponding to the tandem exchange RD in question. Hence at the end of the train, since relay DJA, Fig. 13 is already operated, relay DOG will be re-operated to revert the call a further stage back along the connection to this exchange RD. Relay DOG also brings about the release of relays DA, DB, DG and DOVR so that relay DOG is subsequently held over contacts DOVR2 while contacts DOG7 prevent the restoration of the switch to normal. On the re-operation of relay DOG, the operator's loop is extended into the tandem repeater at the first tandem exchange RE, and thereupon brings up a relay such as EA, Fig. 17, whereupon relay EB, Fig. 16, operates. Relay DOG in operating also extends battery potential back via resistor DYF, Fig. 13, on to the H lead during the release time of relay DOVR so that relay EOG, Fig. 17, will be operated in the tandem repeater at exchange RE. Relay EOG at contacts EOG3 completes a locking circuit for itself and opens the circuit of slow relay EIR and at contacts EOG1 and EOG4, Fig. 16, extends back an earth unbalance comprising the connection of earth potential via contacts EOG1, EIR5 and ENR2 and thence via the winding of retard EI on to the positive junction line and also via contacts ENR4 and rectifier EMRB and contacts EOG4 and EA2 on to the negative line. This earth connection is removed when relay EIR releases after its slow period. At the local tandem exchange RD in question, relays EPC, Fig. 17, and EPR, Fig. 16, are now operated and the latter extends a battery potential forward via resistor EYG, Fig. 18, on to the H lead so as to drop relay DOG, and operate relays DA, DB, DC, DOVR and DG in the incoming selector at this exchange, thus connecting up the incoming selector ready to receive impulses. The changeover of contacts DOG2 and DOG3 has the effect of reversing the current flow over the junction from exchange RD to exchange RE and relay ED in the latter exchange now releases and brings down relay EDR. Relay EIC however is now maintained over contacts EOG1. Relay EA in exchange RD is held over the loop comprising contacts DOV4 and DB2, resistor DYA and contacts DG5.

The incoming selector at exchange RD is now set on to the required subscriber's line by further dialling, impulses being repeated through the tandem repeater at exchange RE by relay EA and the operator initiates ringing in the usual manner by operating her key to transmit back a battery unbalance. This serves to energise relays EPC, EPR and ENC at the first tandem exchange RE, relay ENC being connected in circuit owing to the operation of contacts EOG5. Thereupon at contacts ENR2 and ENR4, Fig. 16, the battery unbalance is repeated back to the second tandem exchange RD. At this exchange the junction conductors such as 80, 81, Fig. 13, will connect via resting contacts of relay DOG with relays DPC and DA and hence when the repeated battery unbalance signal is received from the first tandem exchange, relays DPC, Fig. 15, and DNC, Fig. 14 are operated and at contacts DNC1, Fig. 15, a circuit is completed for relay DRR which connects up ringing current.

When the wanted party replies, relay DD operates to transmit a reversal back which re-operates relays ED and EDR in the tandem repeater at exchange RE whereupon the reversal is repeated back to the operator. In order to connect the parties together, the operator now again throws the key whereupon a battery unbalance is again transmitted and this is repeated by the tandem repeater at exchange RE in the usual manner. Since relay DD is now operated however, a local operating circuit is completed for relay DCR, relay DP, Fig. 13, having been operated from the calling tandem repeater. Relay DCR functions as already described to apply earth potential at contacts DCR6, Fig. 13, to the incoming SW lead from the tandem hunter, and at contacts DCR3, Fig. 14, it extends a battery marking via resistor DYL and relay DRS and contacts DOG6 to the called subscriber's D lead which is connected to the SW bank, Fig. 15. The earth potential extended via lead SW, Fig. 13, into the tandem hunter brings up relay ERN, Fig. 18, and this relay thereupon at contacts ERN6 prepares another holding loop for relay EA by way of resistor EYF, and at contacts ERN2 transfers relay EK to wiper ETH3 or ETH8 which connects via its bank with the earthed SW lead. Relay EK now releases owing to the short-circuiting effect of the earth and in so doing releases relay EKR, Fig. 16, thus re-making the self-interrupted driving circuit for the magnet ETHM but in this case over contacts ERN8 since operation must take place even if all the junctions are busy. At the same time relays DP and DRF, Fig. 13, in the incoming selector are released owing to the removal of earth from the P lead. The ETH switch wipers are now rotated in search of the called subscriber's battery marking which will appear on the ETH3 or ETH8 bank which connects with the SW leads, and when this marking is reached, relays EK and EKR re-operate and the subscribers are connected together over a circuit involving the tandem repeater in exchange RD only. Relay DRS now operates and releases relays DCR and DHR and operates relay DCN to give the operator a speaking circuit and restore her controls.

When the operator finds that the requisite conversation has commenced between the parties, she withdraws her plugs, whereupon a momentary earth unbalance is transmitted to the tandem repeater in exchange RE to operate relays EPC and EPR. This is repeated to exchange RD as usual and it also results in the release of relay EOG in exchange RE owing to the opening of contacts EPR3. When the unbalance terminates leaving the loop open relays EA and EB release, relays EC and ECA operate and relays EIC, ED, EDR, EK and EKR release to restore the repeater to normal. The release of relay EKR releases relays DP, DFR and DOG in the incoming selector in exchange RE which then restores to normal. In the incoming selector in exchange RD relay DPC releases relay DOVR and subsequently relays DA, DB, DCN, DH and DG release and the switch is restored to normal. Relay EK, Fig. 18, will continue to hold via wiper ETH5 or ETH10 and the H lead which is wired to the P normal lead of the called subscriber's line circuit, and so will hold in series with the called subscriber's cut-off relay CO, Fig. 4, which also operates under this condition.

When the calling and called parties hang up, relays ED, EDR, EIR, EIC, EA, EB, ERN, EK and EKR release in turn and all the equipment is restored to normal.

In case (d) where the called subscriber is on another remote exchange directly connected to this tandem, the operation is very similar to (c) except that in this case the operator will dial on to another tandem repeater serving the required remote exchange instead of direct to the subscriber. Since the level to which the incoming selector is raised does not in this case correspond to the group of junctions over which it was taken into use, relay DJA for the level concerned is not operated and hence relay DAR is operated to initiate a hunting operation. When an idle junction is found, relays DHJ and DHR are operated and the leads from the operator are switched through to a tandem repeater similar to that shown in Figs. 16–18 access to which is obtained over the bracketed leads ISM at the top of Fig. 18. Relays EA, EB and EOG therein are then operated and a loop is placed across the outgoing junction leads such as 90, 91. When the operator dials the digit representing the wanted party's number in the terminal exchange, impulses are repeated thereto at contacts EA2 and relays EC and ECA operate in the usual manner to improve the impulsing circuit by cutting out relays ED and EI and subsequently re-introducing them in two stages. Ringing is initiated by the operator throwing her key whereupon battery unbalance is applied to the line to effect the operation of relays EPC, ENC, EPR and ENR. The battery unbalance is then repeated forward at contacts ENR2 and ENR4 and operates equipment such as that shown in Figs 9 and 10 to signal the wanted party. When he replies, the reversal back over the line operates relay ED which brings up relay EDR and the reversal is repeated back to give the operator answering supervision.

Thereupon or when she is satisfied that she has reached the required party, she again applies battery unbalance whereupon earth is applied over contacts EPR6 and ED2 to the ST lead whence it is extended over contacts DHR1, Fig. 15, to operate relay DCR. Relay ERN in the calling tandem repeater is then again operated from the SW bank by contacts DCR4 and the uniselector hunts to find the junction marked over the SW lead from the incoming selector bank. The junction found in this case by the hunter uniselector will not be one extending to the main exchange for which hunting takes place under control of the P wiper and it is therefore arranged to have an earth potential permanently connected to the associated P contact, as for instance the P contact associated with junction line 90, 91 and extending into the tandem hunter multiple THM at the top of Fig. 17. Hence on the re-operation of relays EK and EKR in the calling repeater when the called remote junction is found, relay EJD, Fig. 18, is operated over the P wiper and contacts EIC1, ERN1 and EKR5 and this relay at contacts EJD1 and EJD2, Fig. 17 removes relays EA and EPC from the line. Similarly relay EJD in the called repeater is brought up via the earthed lower winding of relay EK, contacts ERN5 and EKR4 and wiper and bank ETH5 or ETH10 of the calling repeater and the H lead which enters the called repeater via multiple THM, Fig. 17, and which connects via normal contacts EKR5 with the EJD relay in this repeater. Since however relay ERN is not operated in the called repeater, relay EA is maintained in a local circuit including contacts ERN7 and resistor EYD and thus maintains relays EB and EOG. The reason for these operations is that in the junction-to-junction call concerned two tandem repeaters are involved, and since both outgoing junctions require the ED and EI relay combination, Fig. 16, they both have their EA relay removed from the line to give minimum transmission loss conditions. The calling repeater supplies the talking capacitors EQB and EQC, access to the called repeater being had via the multiple, Fig. 17, as stated previously.

When the operator removes the plugs the release of the equipment she has used in setting up the connection is effected as previously described in response to the usual momentary earth unbalance combined with the subsequent opening of the loop. The release of the speaking connection over the two tandem repeaters takes place when the calling party hangs up whereupon relays ED, EDR, EIR, EIC, ERN, EJD, EK and EKR in the calling repeater release in turn. The release of relay ERN removes earth from the H lead and hence relays EJD, EA, EB and EOG in the called repeater are released.

The case where the call is to be extended via a remote tandem exchange based on this exchange and located in the calling path, viz. case (e), has already been largely dealt with. The call proceeds as in (c) up to the point where the operator dials up the incoming selector in this exchange. The number dialed will be that corresponding to the group of junctions containing the repeater under discussion, i. e. that containing the outward call, and hence a further stage of reversion is necessary. The incoming selector on being stepped vertically brings up relay DOG, Fig. 13, over the vertical wiper DAW in usual manner for a revertive type of call, whereupon since relay DJA has been already operated in response to the outgoing call, battery potential will be extended via resistor DYF and contacts DOVR1, DN3, DOG1 and DJA3 on to the H wire to energise relay EOG, Fig. 17, in the calling repeater. Relay EOG in operating, at contacts EOG2, Fig. 16, removes the shunt on the impulse repeating contacts EA2, and at contacts EOG3, Fig. 17, disconnects the circuit of relay EIR. During the slow release of the latter relay an earth unbalance is transmitted back over the junction 90, 91 to the distant tandem exchange so as to cause the operation of relays EPC and EPR in the tandem repeater thereat whereupon relay EPR by applying battery to the H lead operates relay DOV to switch over the line to the incoming selector thereat in order that it may receive the dialing impulses about to be sent.

The tandem repeater of Figs. 16-18 subsequently has to transmit, in addition to impulses, the various control signals which are of two kinds. The first, viz. earth unbalance, is for release of the dialled portion of the call, and its effect on the selector has been described. This signal also serves to turn the repeater back from its outgoing to its incoming condition as would be required after the setting up of a verification call. It will be seen that with relay EOG operated the reception of an earth unbalance signal brings up relay EPC but not relay ENC, and hence the locking circuit of relay EOG will be opened. When this relay releases, and when in addition the unbalance terminates, a circuit will be completed by way of contacts EPR5, EOG3, EDR3 and EIC5 to re-operate relay EIR and the circuit is thus transferred back again to the condition it was in prior to receiving the reversion signal. The other type of signal is the cut-in breakdown series which consists of battery on both wires. In this case, with relay EOG operated, the operation of relay EPC is followed by that of relay ENC, the relief relay ENR ensuring that relay EOG does not release. Relay ENR also serves to extend a battery unbalance as already described to the next repeater or selector.

The other main type of call carried on this circuit is that of calls outgoing to the remote exchange or exchanges reached via the junction 90, 91, Fig. 16.

Three cases need to be considered:

(1) Calls completed via the parent exchange or completed via a tandem exchange between the tandem exchange in question and the parent exchange.

(2) Calls from a subscriber on the local tandem exchange.

(3) Calls from another remote exchange dependent on this local tandem exchange.

In case (1) the repeater is seized from the selector banks via the multiple ISM, Fig. 18, and the relays operated are EA, EB and EOG. The repeater now acts as a straightforward auto-to-auto repeater, received impulses being repeated by contacts EA2, Fig. 16, out over the junction line 90, 91. Provision is also made for extending control unbalance signals via the intermediary of relays EPC, EPR, ENC and ENR as already described.

In case (2) when the call is from a subscriber on the local tandem exchange, the repeater hunter uniselector functions to connect up the called subscriber with the calling local subscriber independently of the parent exchange, and also to forcibly release the local link when connection between the two subscribers has been made. In this case the equipment of Figs. 13-15 is seized from a local link by way of the access at the bottom of Fig. 13 and when the operator dials, the incoming selector hunts to find a tandem repeater such as that of Figs. 16-18 associated with a junction to the wanted exchange which is seized over the access ISM at the top of Fig. 18. Impulses are then repeated to set the incoming selector in the remote exchange on to the line of the wanted party and he is rung by the operator throwing her key.

When the wanted party has replied, the operator again throws her key to apply battery unbalance whereupon relays EPC, ENC, EPR and ENR are operated and relay DCR, Fig. 15, is operated over the ST lead. In this case since relays DAR and DSC are operated, earth is applied to the RN lead to operate relay ERN, Fig. 18. This then at contacts ERN8 initiates the operation of the tandem hunter and at contacts ERN2 provides a test circuit for relay EK to the SW bank. Marking of the calling party is effected by battery by way of relay DRS and resistor DYL, contacts DCR3 and DOG6 and through the local link and the subscriber's D lead which is connected to the SW bank of the tandem hunter. On the operation of relays EK and EKR the calling subscriber is connected through at contacts EKR1 and EKR3 and at contacts EKR4 low resistance earth through the lower winding of relay EK is applied to the H lead of the tandem repeater and extends to the subscriber's P lead in the local link to shunt down the switching relay therein (relay CFH of Fig. 11) and thereupon effect the release of the local connection. Thereupon relay DP, Fig. 13, is also released by the opening of contacts CFR5, Fig. 12, and in turn releases relays DRF and DRC.

When the operator is satisfied that the parties are properly in conversation, she withdraws her calling plug whereupon a momentary earth unbalance is applied to the line. This operates relay DPC which in the usual manner releases relay DOVR and on the resulting release of relay DG the incoming selector is restored to normal.

The connection through the tandem repeater is released when the calling party hangs up whereupon relays EA, EB, ERN, EK, EKR and EOG restore in turn, relays EC and ECA being operated momentarily.

In case (3) when the call is from a subscriber on another remote exchange connected to this tandem exchange, the tandem repeater associated with the calling remote exchange will have associated itself with a free junction to the main exchange via the incoming selector in usual manner. When the operator after ascertaining the required number plugs into the calling junction multiple jack with her calling plug, a battery unbalance signal is automatically sent in the usual manner to operate relays DOV and DOVR and subsequently release relay DOG whereupon the calling tandem repeater is held and the operator is given access to the incoming selector. When the required digit indicating the remote exchange is dialled, the incoming selector will hunt for and seize a tandem repeater associated with a junction to or towards the required remote exchange, this repeater functioning as a normal auto-to-auto repeater for the remaining digit or digits necessary to reach the wanted party. The operator now effects ringing by operating her key as usual, the battery unbalance being repeated by relay ENR in the called repeater.

When the called subscriber answers, the operator again extends a battery unbalance signal to connect up the calling and called subscribers via the local tandem exchange in question. As previously described, relay EPR in the called repeater now applies earth to the ST lead to operate relay DCR which at contacts DCR4 applies earth to the SW lead extending to the tandem hunter multiple THM, Fig. 18, to bring up relay ERN in the calling tandem repeater. At the same time battery marking potential will be extended via resistor DYL and relay DRS, Fig. 14, contacts DCR3, DSC6 and DHR6, the selector SW bank and wiper, Fig. 15 and SW lead, Fig. 18 extending into the tandem hunter multiple THM, Fig. 17, via a connection such as from the incoming selector multiple ISM to the SW contact in the tandem hunter multiple THM associated with the particular called tandem repeater in question. On the operation of relay ERN in the calling tandem repeater, the tandem hunter switch therein is caused to hunt for the SW lead battery marking characteristic of the called tandem repeater. When relays EK and EKR in the searching tandem repeater uniselector operate to halt the switch movement, earth will be extended forward via the lower winding of relay EK, wiper and bank ETH5 or ETH10 and the H lead to bring up relay EJD in the called tandem repeater. At the same time the permanent earth potential on the incoming P contact of this repeater serves to bring up relay EJD in the calling tandem repeater. As a result the EA relays in both repeaters are removed from the line for a purpose described earlier and conversation proceeds between the two parties.

The incoming selector and the junction to the tandem exchange are released when the operator withdraws her plugs whereupon the usual earth unbalance signal is transmitted to operate relay DPC and release relay DOVR.

Release of the established connection between the two parties over the two tandem repeaters takes place in the manner previously described when the calling party hangs up.

I claim:

1. In a telephone system, a plurality of groups of lines, a signalling means associated with each of said lines, an automatic switch having access to said lines, means for extending a calling one of said lines to said switch, directive means in said switch operated responsive to an operation of said signalling means associated with said calling line for causing said switch to be successively associated with said groups of lines, identifying means in said switch for transmitting a series of audio frequency impulses, each corresponding to one of said groups, over said calling line thereby to identify the groups to said calling line, said directive means operated in a different manner responsive to a restoration of said signalling means associated with said calling line for selecting the group of lines which is then associated with said switch, said directive means operated in another manner to responsive to a re-operation of said signalling means associated with said calling line for causing said switch to be successively associated with the lines in the selected group, said identifying means transmitting a second series of audio frequency impulses, each corresponding to one of the lines in the selected group, over said calling line thereby to identify the lines to said calling line, said directive means operated in still another manner responsive to a second restoration of said signalling means associated with said calling line for selecting the line then associated with said switch.

2. A telephone system as claimed in claim 1 including circuit arrangements causing said switch to be released when said signalling means associated with said calling line remains in the operated position beyond a predetermined time interval.

3. A telephone system as claimed in claim 1 in which said plurality of groups of lines includes a group of P. B. X lines, and means in said switch operated in response to the selection of said P. B. X group for causing said switch to search for an idle line included therein in the event that the first line is busy.

4. A telephone system as claimed in claim 1 wherein said automatic switch is a single motion rotary type switch, each of said groups of lines terminating on a corresponding series of adjacent contacts in the banks of said switch, said switch being rotated to a position preceding the series of contacts on which the lines in the desired group are terminated responsive to the first operation and first restoration of said signalling means associated with said calling line, said switch being rotated to the contacts of the desired line in the selected group responsive to the re-operation and second restoration of said signalling means associated with said calling line.

5. In a telephone system, a plurality of lines each having a control element, a finder switch having access to said lines, a numerical switch having access to said lines, means responsive to the initiation of a call over one of said lines for operating said finder switch to associate said numerical switch with said calling line, means in said numerical switch responsive to an operation of said control element of said calling line for operating said numerical switch into association with each of said lines in succession and for concurrently transmitting a series of audio frequency impulses, each corresponding to one of said lines, over said calling line to identify said lines to the calling party, and means in said numerical switch responsive to a restoration of said control element of said calling line for completing a connection between said calling line and the line with which said numerical switch has been associated by said second means.

6. In a telephone system, a plurality of groups of lines each of said lines having a control element, a finder switch having access to said lines, a numerical switch having access to said lines, means responsive to the initiation of a call over one of said lines for operating said finder switch to associate said numerical switch with said calling line, means in said numerical switch responsive to an operation of said control element of said calling line for operating said numerical switch into association with each of said groups of lines in succession and for concurrently transmitting a series of audio frequency impulses, each corresponding to one of said groups, over said calling line to identify said groups to the calling party, means in said numerical switch responsive to a restoration of said control element of said calling line for selecting the group of lines with which said numercial switch has been associated by said second means, said second means responsive to a re-operation of said control element of said calling line for operating said numerical switch into association with each line in the selected group in succession and for concurrently transmitting a second series of audio frequency impulses, each corresponding to one of the lines in the selected group, over said calling line to identify said lines to the calling party, and means in said numerical switch responsive to a second restoration of said control element of said calling line for completing a connection between said calling line and the line with which said numerical switch has been associated by said second means

GEORGE THOMAS BAKER.

REFERENCES CITED

The following references are of record in the file of this patent:

UNITED STATES PATENTS

| Number | Name | Date |
|---|---|---|
| 1,141,937 | Corwin | June 8, 1915 |
| 1,167,646 | McBerty | Jan. 11, 1916 |
| 1,693,124 | Stehlik | Nov. 27, 1928 |
| 1,836,996 | Taylor | Dec. 15, 1931 |
| 1,849,694 | Saunders | Mar. 15, 1932 |
| 1,877,883 | Kahn | Sept. 20, 1932 |
| 1,886,097 | Hatton | Nov. 1, 1932 |
| 2,115,320 | Saunders | April 26, 1938 |
| 2,302,587 | Ulrich | Nov. 17, 1942 |
| 2,337,433 | Walsh | Dec. 21, 1943 |
| 2,340,554 | Peterson | Feb. 1, 1944 |